United States Patent
Karasawa

[11] Patent Number: 6,040,945
[45] Date of Patent: *Mar. 21, 2000

[54] HEAD MOUNT DISPLAY DEVICE

[75] Inventor: Joji Karasawa, Suwa, Japan

[73] Assignee: Seiko Epson Corporation, Tokyo, Japan

[*] Notice: This patent is subject to a terminal disclaimer.

[21] Appl. No.: 09/236,442

[22] Filed: Jan. 25, 1999

Related U.S. Application Data

[63] Continuation of application No. 08/945,807, Nov. 12, 1997, which is a continuation of application No. PCT/JP97/00747, Mar. 10, 1997.

[30] Foreign Application Priority Data

Mar. 11, 1996 [JP] Japan ......................... 8-53296

[51] Int. Cl.$^7$ ..................................... G02B 27/14
[52] U.S. Cl. ..................... 359/630; 359/632; 359/633
[58] Field of Search ................... 359/630, 632, 359/633; 345/8

[56] References Cited

U.S. PATENT DOCUMENTS

| | | |
|---|---|---|
| Re. 27,356 | 5/1972 | La Russa . |
| 4,805,988 | 2/1989 | Dones . |
| 4,997,263 | 3/1991 | Cohen et al. . |
| 5,003,300 | 3/1991 | Wells ........................... 340/705 |
| 5,034,809 | 7/1991 | Katoh . |
| 5,153,569 | 10/1992 | Kawamura et al. . |
| 5,162,828 | 11/1992 | Furness et al. . |
| 5,189,512 | 2/1993 | Cameron et al. . |
| 5,392,158 | 2/1995 | Tosaki . |
| 5,450,596 | 9/1995 | Felsenstein . |
| 5,469,185 | 11/1995 | Lebby et al. . |
| 5,621,424 | 4/1997 | Shimada et al. . |
| 5,683,297 | 11/1997 | Raviv . |
| 5,739,797 | 4/1998 | Karasawa et al. . |

FOREIGN PATENT DOCUMENTS

| | | |
|---|---|---|
| 0 344 881 | 12/1989 | European Pat. Off. . |
| 0 371 873 | 6/1990 | European Pat. Off. . |
| 0 395 570 | 10/1990 | European Pat. Off. . |
| 0 408 344 | 1/1991 | European Pat. Off. . |
| 0 475 491 | 3/1992 | European Pat. Off. . |
| 0 531 121 | 3/1993 | European Pat. Off. . |
| 0 575 257 | 12/1993 | European Pat. Off. . |
| 0 592 318 | 4/1994 | European Pat. Off. . |
| 0 675 382 | 10/1995 | European Pat. Off. . |
| 2 681 702 | 3/1993 | France . |
| 2 690 534 | 10/1993 | France . |
| 62-214782 | 9/1987 | Japan . |
| 5-100192 | 4/1993 | Japan . |
| 6-78247 | 3/1994 | Japan . |
| 6-105256 | 4/1994 | Japan . |
| 6-342129 | 12/1994 | Japan . |
| 7-98716 | 4/1995 | Japan . |
| 7-168120 | 7/1995 | Japan . |
| 7-249006 | 9/1995 | Japan . |
| 8-152576 | 6/1996 | Japan . |
| 8-160342 | 6/1996 | Japan . |
| 8-166557 | 6/1996 | Japan . |
| 2 046 410 | 11/1980 | United Kingdom . |
| 2 278 692 | 12/1994 | United Kingdom . |
| WO 91-04508 | 4/1991 | WIPO . |
| WO 95/11473 | 4/1995 | WIPO . |
| WO 96-00406 | 1/1996 | WIPO . |

OTHER PUBLICATIONS

Nikkei Electronics, pp. 157–177, Jan. 2, 1984.

*Primary Examiner*—Georgia Epps
*Assistant Examiner*—Michael A Lucas
*Attorney, Agent, or Firm*—Oblon, Spivak, McClelland, Maier & Neustadt, P.C.

[57] ABSTRACT

An optical unit 1 includes a liquid crystal panel 2, a back light 3, a reflecting mirror 4, a lens 5, and a casing 6 for accommodating these constituents therein. The optical unit 1 can be arranged in front of either the left eye or the right eye of the user. A half mirror 8 disposed below the optical unit 1 reflects an image beam emitted from the optical unit 1 toward an eye 10 of the user and transmits a light beam from the background view. The eye of the user which observes a virtual image is changed by shifting the optical unit 1 to the left eye or to the right eye.

1 Claim, 20 Drawing Sheets

HEAD MOUNT DISPLAY DEVICE

CROSS-REFERENCES TO RELATED APPLICATIONS

This application is a continuation of application Ser. No. 08/945,807 filed on Nov. 12, 1997 which is a continuation of PCT/JP97/00747 filed Mar. 10, 1997.

BACKGROUND OF THE INVENTION

1. Field of the Invention

The present invention relates to a single-eye-type head mount display device (hereinafter referred to as HMD) for magnifying an image generated by an image display means to a magnified virtual image and enabling the magnified virtual image to be seen by either one of the eyes of the user.

2. Discussion of the Background

The necessity for observing a display image shown by the image display means simultaneously with a background image has resulted in the development of single-eye-type HMDs. Various applications of such single-eye-type HMDs to computer display devices and instruction display devices for the aid of manual operations have also been in demand.

A known example of such single-eye-type HMDs is disclosed in JAPANESE PATENT LAYING-OPEN GAZETTE No. H-2-63379. Another example disclosed in JAPANESE PATENT LAYING-OPEN GAZETTE No. H-3-189677 is known as a single-eye-see-through-type HMD.

The single-eye-see-through-type HMD described in JAPANESE PATENT LAYING-OPEN GAZETTE No. H-3-189677 combines an image beam emitted from an optical system arranged at the side of the face of the user with a light beam from a background by means of a combiner arranged in front of the face, thereby superposing a display image upon a background image. In this conventional single-eye-type HMD, the eye for observing the display image is fixed to either the left eye or the right eye, i.e., the user cannot select the eye for observing the display image.

Generally people have a preferential eye for observation among the two eyes. The degree of contribution of the preferential eye for observation of images depends upon the person. The preferential eye for observing the display image may vary depending upon the state of application of the HMD and the physical characteristics of the user. It is also possible that the user of the HMD may have a disorder in one eye. It is accordingly inconvenient to fix the eye for observing the display image in the single-eye-type HMD to either the left eye or the right eye.

An object of the present invention is thus to solve the above problem and provide a single-eye-type HMD that enables the user to observe a composite image of a background image and a display image and to readily select the eye for observing the display image.

SUMMARY OF THE INVENTION

Accordingly, one object of the invention is to provide a head mount display device which comprises an image display means, a magnifying optical means, and a switching means. The magnifying optical means is implemented by, for example, a lens or a concave mirror, and refracts a first light beam representing an image formed on the image display means and thereby magnifying the image to a magnified virtual image which is to be observed with one of the eyes of the user. The image combining means is implemented by, for example, a half mirror or a polarizing beam splitter, and causes the first light beam representing the virtual image enter the eye of the user simultaneously with a second light beam from a background view, thereby combining the virtual image with the background view to form a composite image. The switching means shifts to at least two positions relative to the image display means, the magnifying optical means, and the image combining means, in order to make a switch between a first state in which the composite image of the virtual image and the background view is observed with one eye of the user and a second state in which the composite image is observed with the other eye of the user.

In a preferred embodiment, the magnifying optical means and the image combining means are arranged such that the first light beam emitted from the image display means goes first to the magnifying optical means and then the image combining means before reaching the eye of the user. In this case, the magnifying optical means may be implemented by a lens, for example.

In another preferred embodiment, the image combining means and the magnifying optical means are arranged such that the first light beam emitted from the image display means goes first to the image combining means and then the magnifying optical means at least once in this sequence before reaching the eye of the user. In this case, the magnifying optical means may be implemented by a concave half mirror or a concave mirror, for example.

The head mount display device of the present invention enables the user to observe a composite image of a background image and a display image with either the left eye or the right eye. The switching means readily permits the eye for observing the composite image of the display image and the background to be changed.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1A:
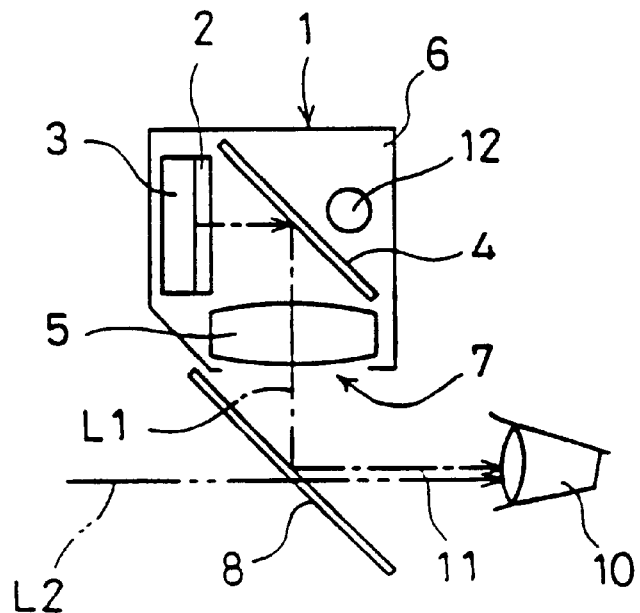
FIGS. 1A and 1B illustrate the structure of an optical system of an HMD as a first embodiment according to the present invention.
Figure 1B:
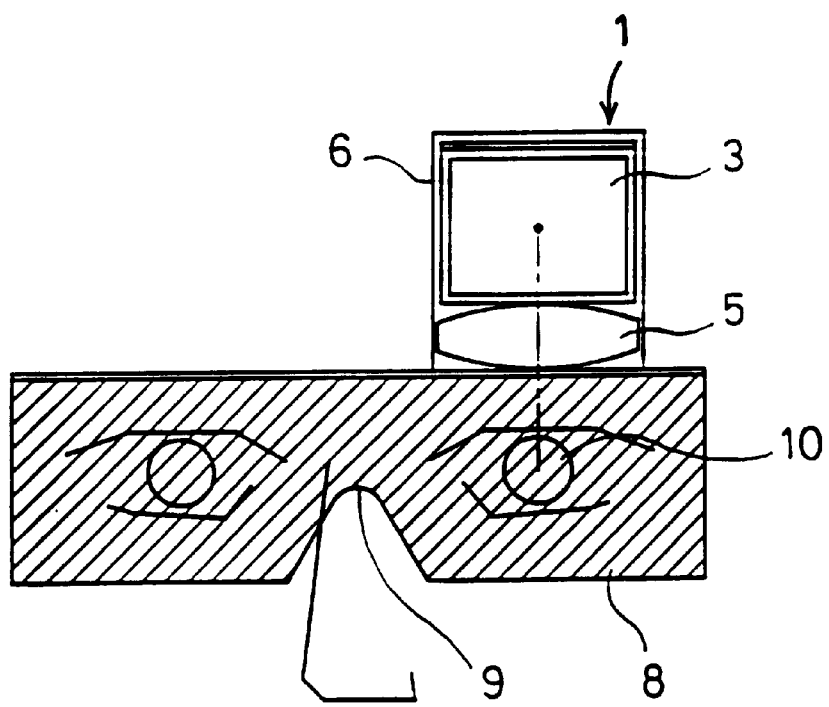
Figure 2:
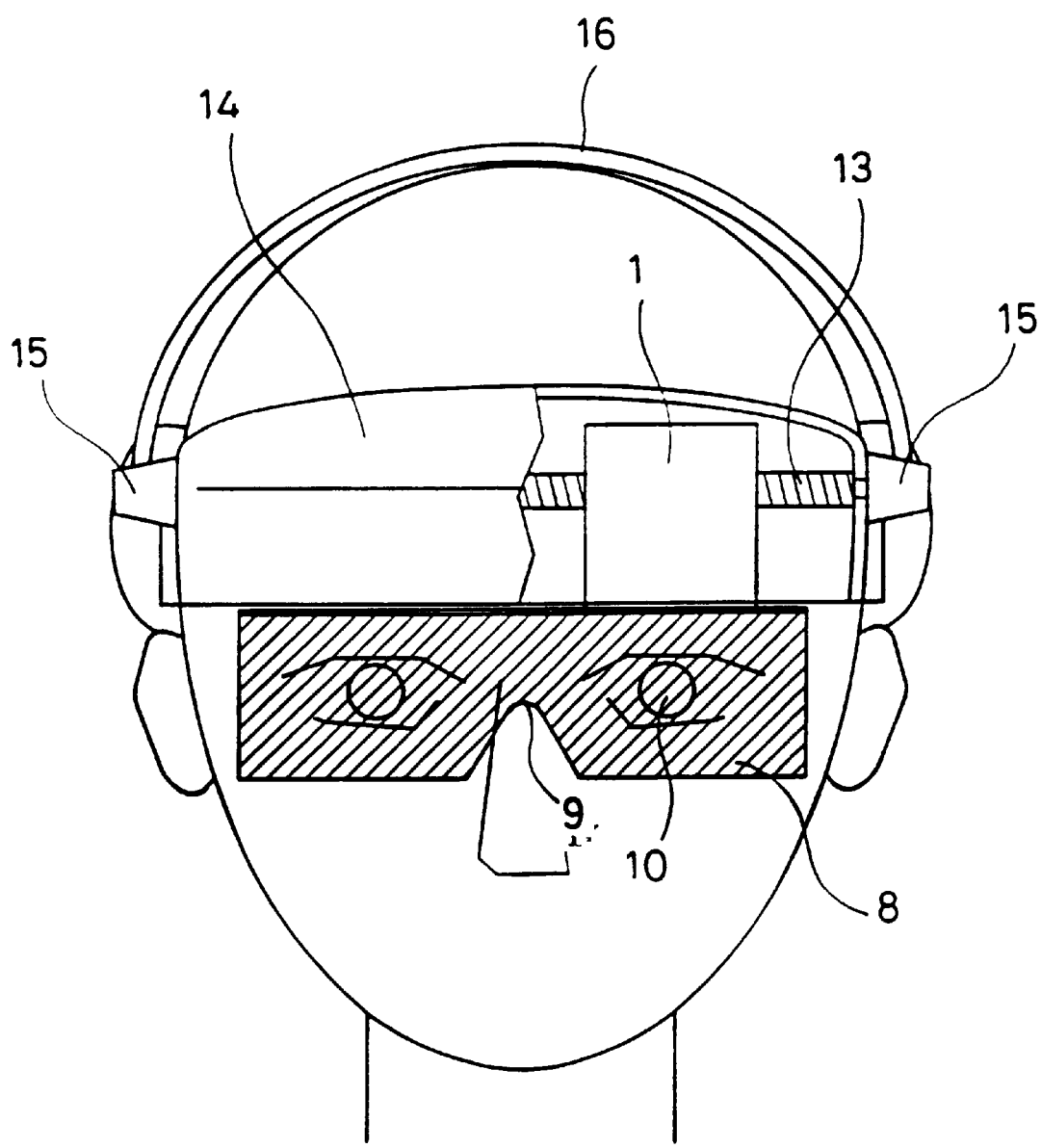
FIG. 2 shows the appearance of the HMD of the first embodiment.

Referring now to the drawings, wherein like reference numerals designate identical or corresponding parts throughout the several views, and more particularly to FIG. 1 thereof, FIG. 1(a) is a side view illustrating an optical system of a head mount display device (HMD) as a first embodiment according to the present invention, and FIG. 1(b) is a front view thereof. FIG. 2 shows a cross-sectional view of the HMD including the optical system of FIG. 1, partly cross sectional for description.

An optical unit 1 shown in FIG. 1(a) can be set in front of the left eye or the right eye of the user. The optical unit 1 includes a transmission-type liquid crystal panel 2, a back light 3, a reflecting mirror 4, a convex lens 5, and a casing 6 for accommodating these constituents therein. The liquid crystal panel 2 and the back light 3 form a display device for displaying an image in response to an image signal output from an external driving circuit, which is not shown. The lens 5 functions as a magnifying optical device for magnifying a display image displayed on the liquid crystal panel 2 to generate a magnified virtual image and enabling a light beam representing the magnified virtual image to enter the eye of the user.

The liquid crystal panel 2 and the back light 3 are set upright in the casing 6 so that the normal of an image forming surface of the liquid crystal panel 2 is oriented substantially in the horizontal direction. The reflecting mirror 4 is inclined by the angle of approximately 45° to the normal of the image forming surface of the liquid crystal panel 2, and reflects an image beam L1 emitted from the liquid crystal panel 2 vertically downward. The lens 5 is arranged so that the optical axis of the lens 5 is perpendicular to the normal of the image forming surface of the liquid crystal panel 2. An opening 7, through which the image beam L1 passes, is formed in the lower face of the casing 6. A half mirror 8 is disposed in the opening 7 to be inclined by the angle of approximately 45° to the optical axis of the lens 5.

The upper end of the half mirror 8 is fixed to a main case 14 shown in FIG. 2. The transmittance and reflectivity of the half mirror 8 can be set arbitrarily. For example, both the transmittance and reflectivity may be set to 50%. The half mirror 8 is large enough to cover the visual field of virtual images at both eyes of the user. The visual field of virtual images is defined by the visual angle when the eye sees a virtual image. The half mirror 8 has a recess 9 on the center thereof for the nose of the user. The optical unit 1, the half mirror 9, and the main case 14 including non-illustrated circuits and other elements are fixed to the head of the user by means of an attachment 16.

As shown in FIG. 1(a), the display image created by the liquid crystal panel 2 is illuminated from the rear side by the back light 3, and the image beam L1 (first light beam) is emitted from the liquid crystal panel 2. The image beam L1 is deflected to approximately 90 degrees by the reflecting mirror 4, refracted by the lens 5, reflected at the ratio corresponding to the transmission/reflection characteristics of the half mirror 8, and forms an image in an eye 10 of the user. The image forming surface of the liquid crystal panel 2 is located closer to the lens 5 than one focal point of the lens 5 on the object's side, whereas the eye 10 is located in the vicinity of the other focal point of the lens 5 on the image's side. The imaging function of the lens 5 thus magnifies the display image and creates a magnified virtual image. In this manner, the user can observe the magnified virtual image of the display image created by the liquid crystal panel 2 on an extension of an optical axis 11 drawn through the eye 10 and the optical unit 1.

The half mirror 8 reflects part of the image beam L1 while transmitting part of a light beam L2 from the background view to introduce the latter into both eyes of the user. The half mirror 8 functions as an image combining device for combining the first light beam L1 representing the image displayed on the liquid crystal panel 2 with the second light beam L2 from the background view to create a composite image and enabling the composite image to enter an eye of the user. In this manner, the user can observe the composite image of the background image and the display image. Since one end of the half mirror 8 is fixed to the main case as mentioned above, there is no obstacle blocking the background view from the visual field of the user other than the main case 14 located above. Thus, the HMD of the invention ensures the maximum visual field for the background. The light beam L2 from the background view passing through the half mirror 8 enters both the left and the right eyes, so that the left and the right eyes receive rays of substantially identical brightness. This structure enables the user to naturally observe the background image.

As made apparent from the above description, the term 'single-eye-type' in this specification implies that the display image is observed with one eye. Even when the optical system of the HMD (for example, the half mirror 8) includes the visual field corresponding to both eyes, the HMD is still of the 'single-eye-type'.

Referring to FIG. 1(a), the optical unit 1 of the first embodiment has a hollow bearing 12 disposed behind the reflecting mirror 4. The inner face of the bearing 12 is formed as a female screw, which mates with a shaft 13 in the main case 14 shown in FIG. 2. The shaft 13 has a length that passes through the main case 14 from side to side and both ends held by the main case 14 to allow the shaft 13 to rotate. A pair of knobs 15 are fixed on both ends of the shaft 13 projected from both the sides of the main case 14. The bearing 12, the shaft 13, and the knobs 15 implement the function of a switching means for shifting the optical unit 1 to a position in front of either the left eye or the right eye. When the user manually rotates either one of the knobs 15, the shaft 13 rotates relative to the main case 14 and the optical unit 1 accordingly shifts to the right or to the left. The optical unit 1 is provided with a non-illustrated rotation stop for preventing rotation of the optical unit 1 with the rotation of the shaft 13. An operation of the knob 15 moves the optical unit 1 substantially along the span of the eyes of the user so that the optical unit 1 may be switched between a first state in which the user observes the virtual image with the left eye as shown in FIG. 1(*b*) and a second state in which the user observes the virtual image with the right eye. The optical unit 1 is movable to any arbitrary position substantially along the span of the eyes. This enables positional adjustment according to the actual span of the eyes of the user.

As discussed above, in the see-through-type HMD of the first embodiment, only the half mirror 8 is interposed between the eyes of the user and the background image, so that the user can observe the background image under substantially no optical influence. There is no obstacle blocking the user's visual field of the background view except the main case 14 disposed above. This ensures the maximum visual field of the background view. The user can select either the left or the right eye for observing a virtual image, while the HMD is worn on the head. This structure is especially favorable when a plurality of users share a single HMD. The user can readily change the eye for observing a virtual image according to the state of application of the HMD and the physical characteristics of the user. The see-through structure enables the user to observe most images of the background view with both eyes. Further, since the observation of the display image with a single eye does not require any special effort of the user to combine images, the user may readily observe the display image by merely changing his or her focus.

To account for the use of eyeglasses with the HMD, it is preferable that the distance between the lens 5 and the eye 10 in FIG. 1(*a*) is approximately 60 mm. For magnification of the display image into a magnified virtual image under such conditions, it is desirable to make the distance between the liquid crystal panel 2 and the lens 5 as long as possible. The first embodiment uses the reflecting mirror 4 to bend the optical path in order to satisfy both this preference and the preference for compactness. The relative positions of the liquid crystal panel 2, reflecting mirror 4, convex lens 5, and half mirror 8 are not restricted to the first embodiment but may be modified in various ways. An example of such a modification omits the reflecting mirror 4 and arranges the liquid crystal panel 2 face down above the lens 5. If the liquid crystal panel 2 is arranged in the front position of the HMD as shown in FIG. 1(*a*), for example, one possible modification omits the back light 3 and includes a new opening in the casing 6 on the side of the rear face of the liquid crystal panel 2. The external light through this opening can be utilized for illumination of the liquid crystal panel 2.

The switching device including the bearing 12, the shaft 13, and the knobs 15 are also not restricted to the first embodiment but may be modified in various ways. As will be discussed in the following embodiments, the switching device for changing the eye for observation of an virtual image may be any mechanism that can move at least two of the image display device (for example, the liquid crystal panel 2), the magnifying optical device (for example, the lens 5), and the image combining device (for example, the half mirror 8).

The above structure may be additionally provided with an adjustment mechanism which shifts either the liquid crystal panel 2 or the lens 5 in the direction of its optical axis and thereby adjusts the relative distance between the liquid crystal panel 2 and the lens. The adjustment mechanism can adjust the relative distance between the liquid crystal panel 2 and the lens 5 to be suited to the visual ability of the user, thereby further facilitating observation of a virtual image.

Figure 3A:
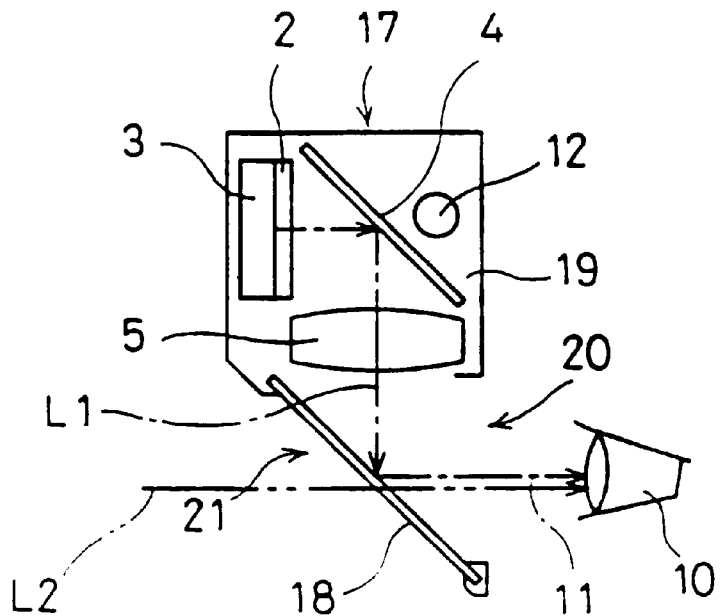
FIGS. 3A and 3B illustrate the structure of an optical system in a second embodiment according to to the present invention.

FIG. 3(*a*) is a side view illustrating a second embodiment according to the present invention, and FIG. 3(*b*) is a front view thereof.

An optical unit 17 shown in FIG. 3(*a*) can be set in front of either the left eye or the to right eye of the user. In the example of FIG. 3(*b*), the optical unit 17 is placed in front of the left eye. Referring to FIG. 3(*a*), the optical unit 17 includes the liquid crystal panel 2, the back light 3, the reflecting mirror 4, the lens 5, a half mirror 18, and a casing 19 for accommodating these components therein. The relative positions of the liquid crystal panel 2, the back light 3, the reflecting mirror 4, the lens 5, and the half mirror 18 are identical with those of the first embodiment. The half mirror 18 has the same transmission/reflection characteristics as those of the half mirror 8 of the first embodiment. As shown in FIG. 3(*b*), however, the half mirror 18 has the size covering the visual field of a virtual image for a single eye of the user.

As shown in FIG. 3(*a*), the casing 19 has a substantially trapezoidal side section and is provided with an opening 20 formed in its upright surface to face the eye 10 of the user. Another opening 21 is formed in the slant surface of the casing 19, in which the half mirror 18 is disposed. The second embodiment is different from the first embodiment in that the half mirror 18 is accommodated together with other optical elements in the optical unit 17. The optical unit 17 is engaged with the main case 14 by means of the same structure as that of the first embodiment shown in FIG. 2.

Figure 4:
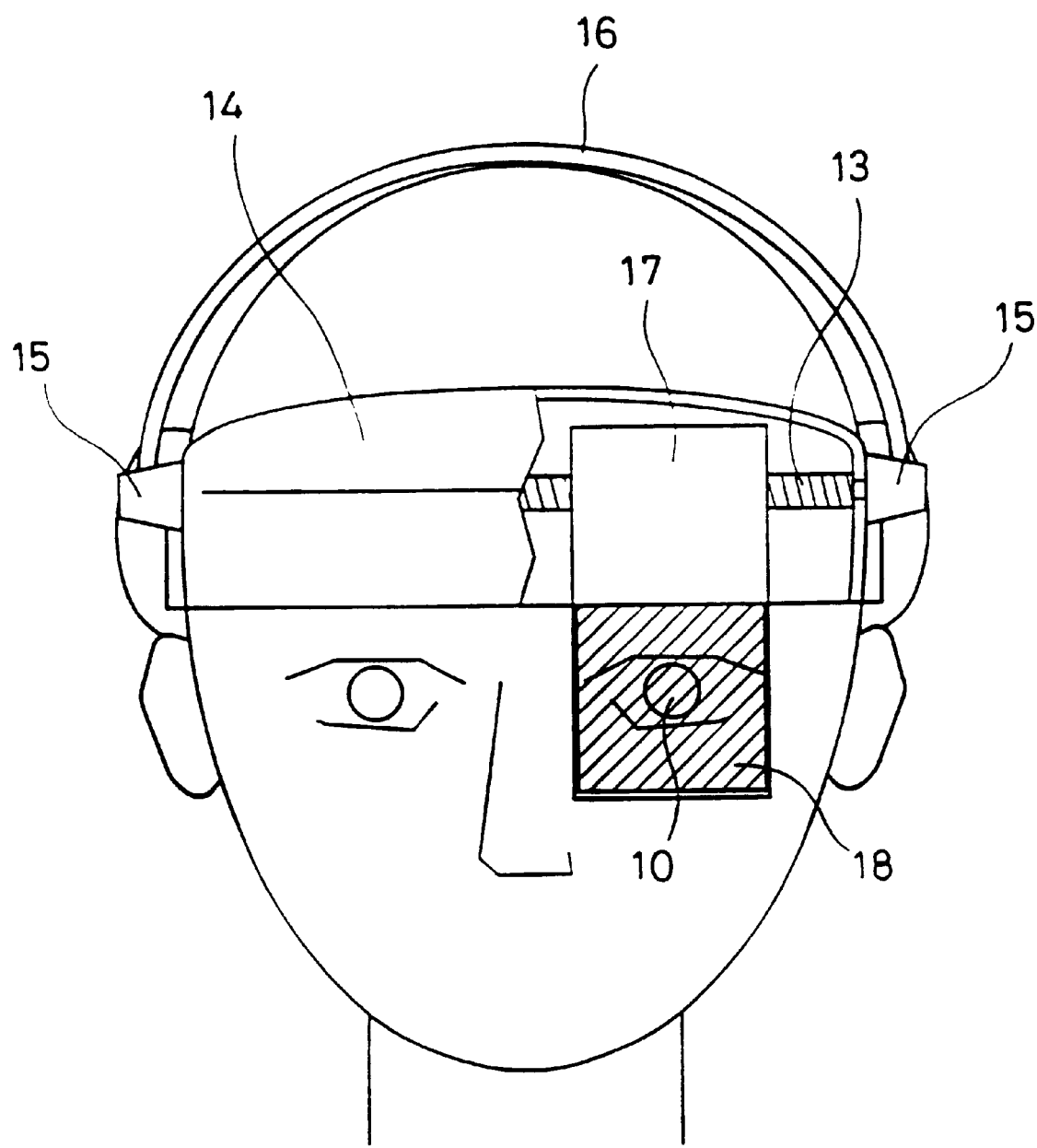
FIG. 4 shows the appearance of the HMD of the second embodiment.

FIG. 4 shows the appearance of the HMD of the second embodiment. The only difference from the first embodiment shown in FIG. 2 is that the half mirror 18 for a single eye is integrated with the optical unit 17.

As shown in FIG. 3(*a*), the image beam L1 emitted from the liquid crystal panel 2 is combined with the background beam L2 and enters the eye 10 in front of which the optical unit 17 is disposed. Part of the background beam L2 is reflected by the half mirror 18, and only the rest enters the eye 10. As shown in FIG. 3(*b*), on the other hand, the half mirror 18 does not exist in front of the eye at which the optical unit 17 is not disposed. The background beam L2 enters the eye that does not observe the virtual image without any loss of transmittance. In the HMD of the second embodiment, the brightness of the background image observed with the left eye is thus significantly different from that with the right eye. Generally, the difference in brightness between the visual fields of the left eye and the right eye of 70% or more causes a conflict of the visual fields and makes it hard to see both the images. When the difference in brightness between the visual fields of the left eye and the right eye is not greater than 30%, on the other hand, stable observation is likely even for a relatively long time. In the second embodiment, the transmission/reflection characteristics of the half mirror 18 are adequately adjusted to make the difference in brightness between the visual fields of the left eye and the right eye not greater than about 30%, so as to facilitate observation of the background view. Actually, the reflectivity and the transmittance of the half mirror 18 are respectively set equal to approximately 30% and 70%. Such adjustment enables the difference in brightness between the background images observed with the left eye and the right eye to be approximately 30%. The extremely high transmittance, however, prevents reflection of the image beam L1. It is thus preferable to make the reflectivity as high as possible in order to make the display image brighter.

Figure 3B:
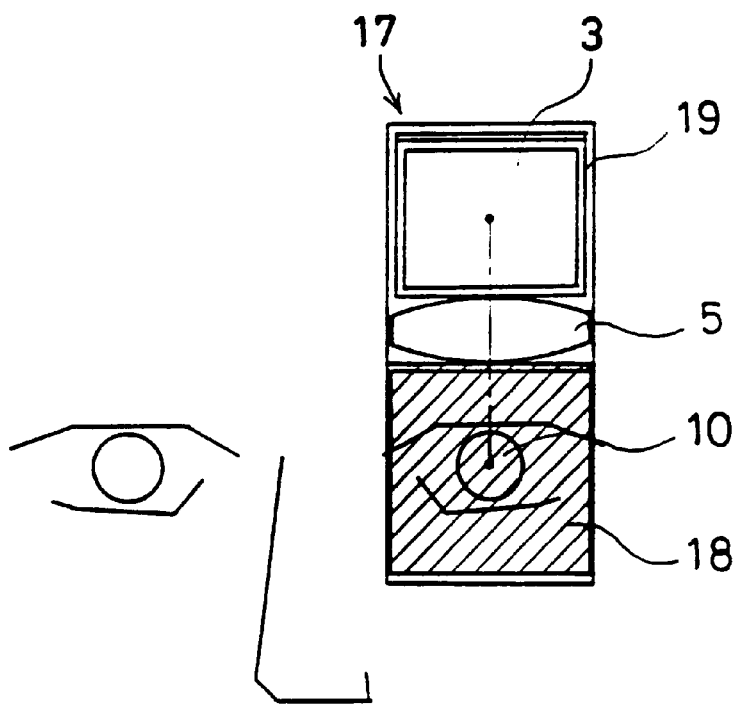

The switching device for changing the eye for observation of a virtual image has a similar structure to that of the first embodiment, except that the half mirror 18 of the second embodiment is assembled with the optical unit 17 and moves with the other optical elements from side to side whereas the half mirror 8 of the first embodiment is stationary. The function of the switching device in the second embodiment is completely identical with that in the first embodiment. A rotation of either the left knob or the right knob 15 moves the optical unit 17 along the width of the eyes of the user to be switched between a first state in which the user observes a virtual image with the left eye as shown in FIG. 3(b) and a second state in which the user observes a virtual image with the right eye. In the second embodiment, simultaneous movement of the liquid crystal panel 2, the lens 5, and the half mirror 18 maintains the fixed positional relations among these three optical elements. This advantageously ensures more stable performance of the optical system including these optical elements. The second embodiment further reduces the restriction on positioning of the optical system relative to the eye of the user and increases the degree of freedom in the positioning. Further, since the half mirror 18 can be made as small as is operationally possible and is integrated with the optical unit 17, the size of the whole apparatus can be reduced and the possibility of damaging the half mirror 18 is reduced.

Figure 5A:
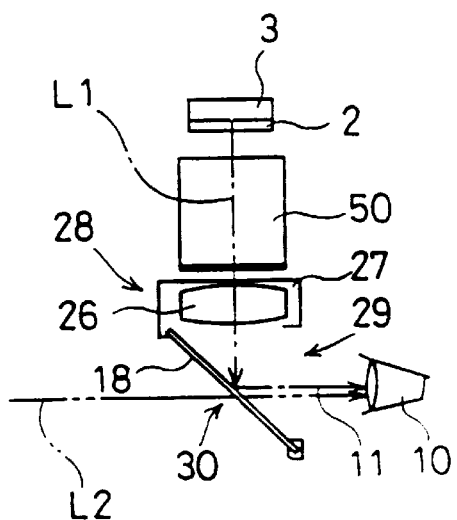
FIGS. 5A, 5B, 5C, and 5D illustrate the structure of an optical system in a third embodiment according to the present invention.
Figure 5B:
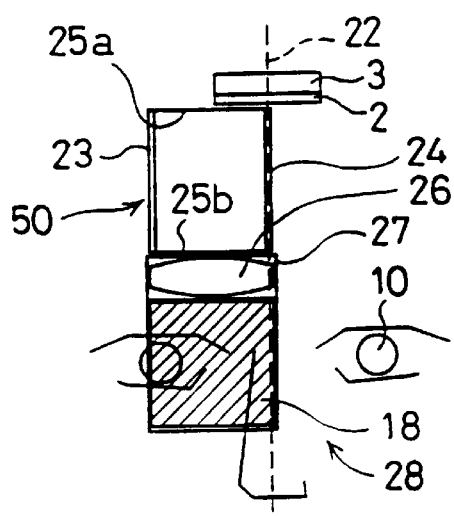
Figure 5C:
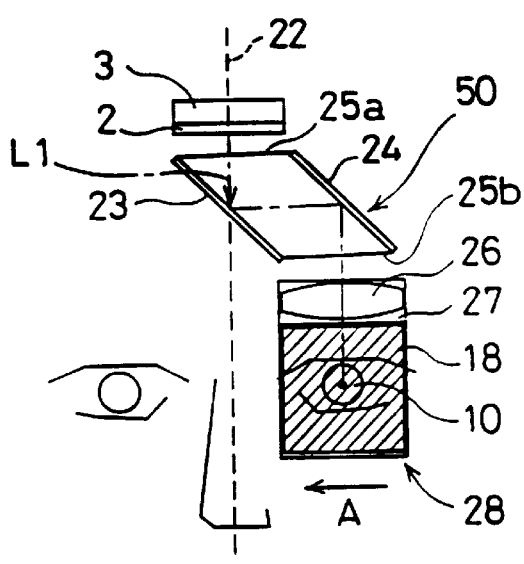
Figure 5D:
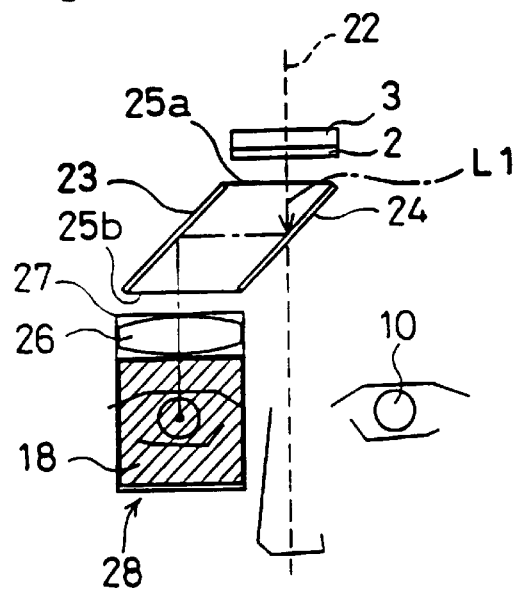

FIG. 5(a) is a side view illustrating a third embodiment according to the present invention; FIG. 5(b) is a front view showing a first state in which the user observes a virtual image with the left eye; FIG. 5(c) illustrates a changing mechanism for changing the eye for observation of a virtual image; and FIG. 5(d) is a front view showing a second state in which the user observes a virtual image with the right eye.

Referring to FIG. 5(a), in this optical system, a reflection unit 50 and an optical unit 28 are disposed below the liquid crystal panel 2.

The optical unit 28 comprises a lens 26, the half mirror 18, and a casing 27 for accommodating these constituents therein. As shown in FIG. 5(a), the casing 27 has a substantially trapezoidal side section and is provided with an opening 29 formed in its upright surface to face the eye 10 of the user. Another opening 30 is formed in the slant surface of the casing 27 in which the half mirror 18 is disposed.

Referring to FIG. 5(b), the reflection unit 50 includes two reflecting mirrors 23 and 24 arranged substantially parallel to each other, and also includes two link members 25a and 25b for linking the two reflecting mirrors 23 and 24 with each other. The link members 25a and 25b respectively link the upper ends and the lower ends of the two reflecting mirrors 23 and 24 to form a parallelogram. Even when the parallelogram of the reflection unit 50 is deformed, this structure enables the two reflecting mirrors 23 and 24 to be kept substantially parallel to each other. In the first state of FIG. 5(b) and in the second state of FIG. 5(d), the two reflecting mirrors 23 and 24 are inclined respectively by the angle of approximately 45 degrees to the normal of the display surface of the liquid crystal panel 2.

When the user observes a virtual image with the left eye as shown in FIG. 5(b), the image beam L1 from the liquid crystal panel 2 is reflected first by the first reflecting mirror 23 and then by the second reflecting mirror 24. When the user observes a virtual image with the right eye as shown in FIG. 5(d), on the other hand, the image beam L1 from the liquid crystal panel 2 is reflected first by the second reflecting mirror 24 and then by the first reflecting mirror 23. The image beam L1 deflected by these two reflecting mirrors 23 and 24 subsequently enters the lower optical unit 28. The reflection unit 50 accordingly is a reflection device for reflecting the image beam L1 and a deflection device for deflecting the image beam L1.

Figure 6:
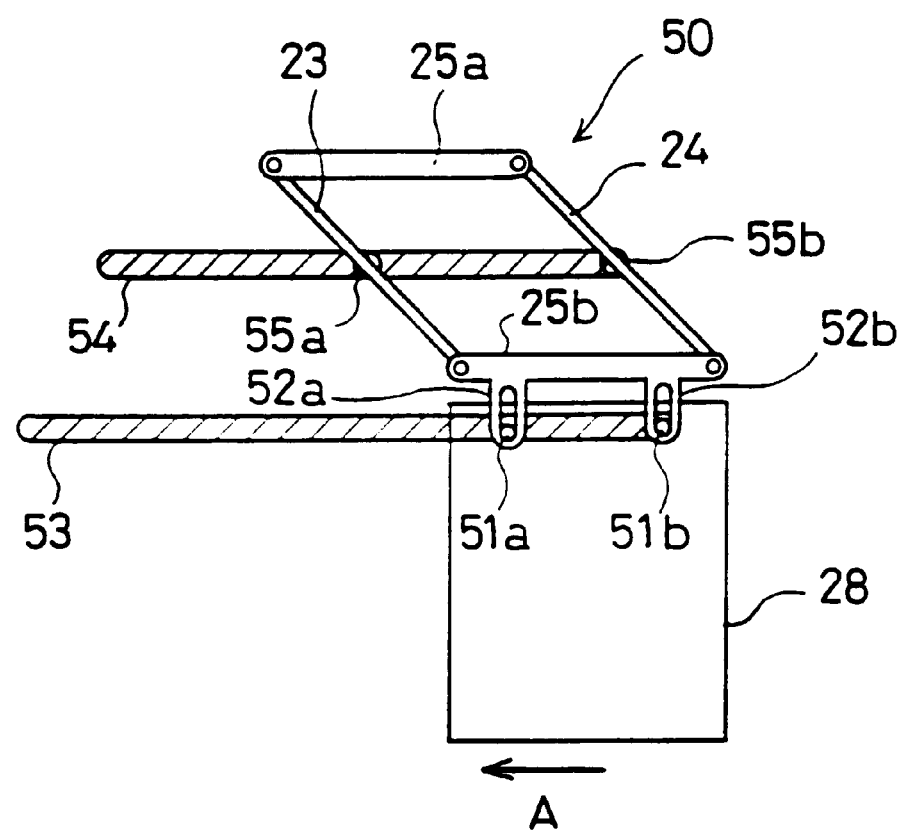
FIG. 6 illustrates the structure of a shape changing mechanism in the third embodiment.

FIG. 6 illustrates a shape changing mechanism for changing the shape of the reflection unit 50 with a movement of the optical unit 28. Two pins 51a and 51b are formed in the rear face of the optical unit 28. The second link member 25b has two mating elements 52a and 52b on its lower end. These mating elements 52a and 52b respectively have slots extending in the vertical direction. The two pins 51a and 51b of the optical unit 28 pass through the slots of the two engaging parts 52a and 52b of the link member 25b and is slidably fitted in a groove 53 formed in the main case 14 (see FIG. 2). The two reflecting mirrors 23 and 24 have pins 55a and 55b disposed on their respective centers. These pins 55a and 55b are slidably fitted in another groove 54 formed in the main case 14. In the illustration of FIG. 6, as a matter of convenience, the grooves 53 and 54 are filled with slant lines for clear distinction from the other constituents.

The user shifts the reflection unit 50 and the optical unit 28 in the horizontal direction to switch between the first state shown in FIG. 5(b) and the second state shown in FIG. 5(d). Comparison between FIGS. 5(b) and 5(d) shows that the liquid crystal panel 2 and the back light 3 are arranged face down on a center line 22 of the width of the apparatus and do not shift through the switching operation of the eye for observation of a virtual image.

FIG. 5(c) shows the state in mid course of a switch from the first state shown in FIG. 5(b) to the second state shown in FIG. 5(d). In the state of FIG. 5(b), the shape changing mechanism of the reflection unit 50 is set at the position of FIG. 6. When a force is applied in the direction of an arrow A to the optical unit 28 in the state of FIG. 6, the optical unit 28 moves along the groove 53 (see FIG. 6) to the right eye (leftward in FIG. 6) and the reflection unit 50 accordingly moves along the groove 54. At this moment, the reflection unit 50 substantially keeps the parallelogrammatic shape of FIG. 5(b) while moving with the optical unit 28. When the pin 55a (see FIG. 6) disposed on the center of the reflecting mirror 23 reaches an end of the groove 54, the parallelogram of the reflection unit 50 is gradually deformed to the state of FIG. 5(d) via the state of FIG. 5(c) while the two pins 55a and 55b remain in position. The optical unit 28 moves to the position in front of the right eye to effect the second state shown in FIG. 5(d). Reverse operations and movements are carried out to change the eye for observing the virtual image from the right eye to the left eye.

In the first state shown in FIG. 5(b) and in the second state shown in FIG. 5(d), the reflection unit 50 and the optical unit 28 are fixed by any known mechanical positioning mechanism, such as combination of pins with engaging holes.

A variety of structures other than those discussed above are applicable for the reflection unit 50 and its shape changing mechanism. For example, the shape of the reflection unit 50 may be changed while the upper link member 25a is kept to face the liquid crystal panel 2 and the lower link member 25b is kept to face the lens 26. As long as the two states shown in FIGS. 5(b) and 5(d) can be realized, neither the transient state nor the movement of reflection unit 50 is important.

Figure 7A:
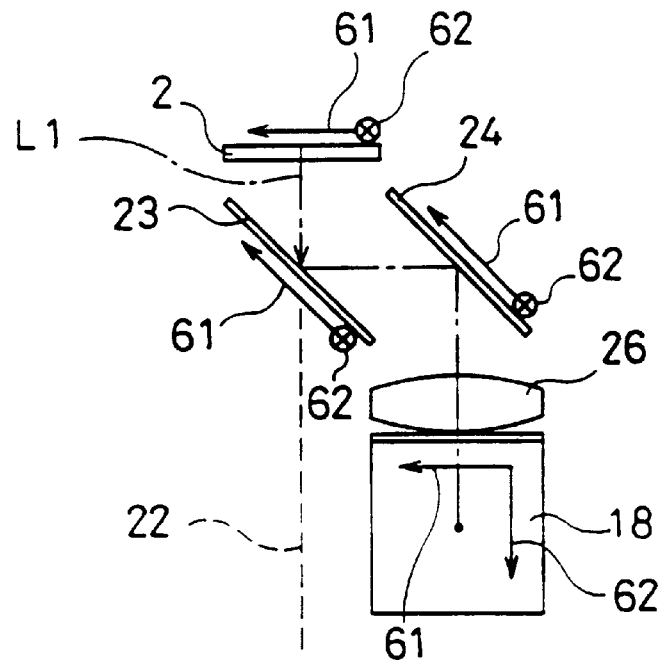
FIGS. 7A and 7B illustrate the states of forming images in the third embodiment.
Figure 7B:
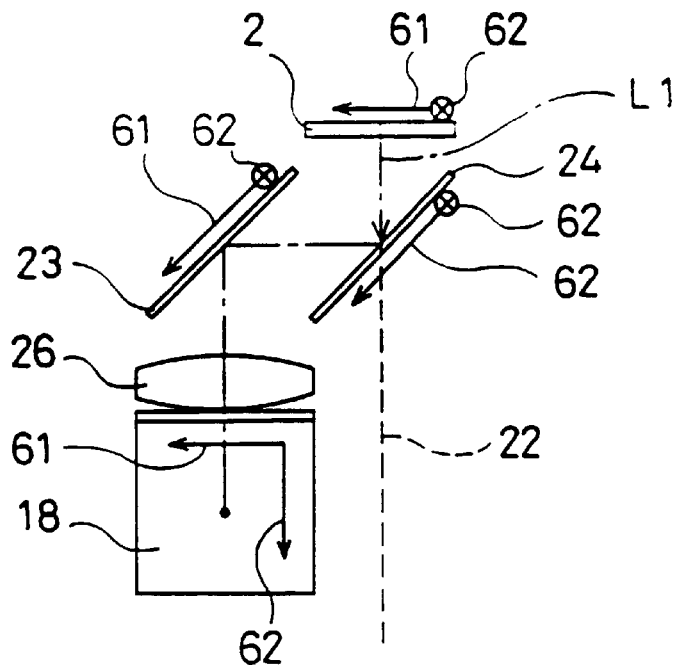

FIG. 7 shows that the user can observe a virtual image in the same direction both in the first state shown in FIG. 5(*b*) and in the second state shown in FIG. 5(*d*). FIG. 7(*a*) represents the first state in which the user observes a virtual image with the left eye, whereas FIG. 7(*b*) represents the second state in which the user observes a virtual image with the right eye. In these drawings, the arrows drawn in the vicinity of the respective optical elements denote a first direction 61 that is equivalent to a first coordinate axis of the image forming surface of the liquid crystal panel 2. The encircled crosses denote a second direction 62 that is equivalent to a second coordinate axis of the image forming surface. The second direction 62 goes from the front to the back of the drawing sheet. The arrows representing these directions 61 and 62 are drawn on the half mirror 18. As seen from FIGS. 7(*a*) and 7(*b*), an image formed on the liquid crystal panel 2 is reflected three times and observed as an image in the same orientation with either the left eye or the right eye. Thus, no electrical switching operation regarding the direction of displaying the image is required in the process of changing the eye for observing the virtual image.

As discussed above, the third embodiment can switch the eye for observation of a virtual image while keeping the liquid crystal panel 2 and the back light 3 at a fixed position. Since the liquid crystal panel 2 and the back light 3 are electrically connected with a driving circuit, no shift of the liquid crystal panel 2 and the back light 3 is desired for the electrical reliability. In other words, the third embodiment ensures the high electrical reliability in the process of switching the eye for observing the virtual image.

Since the position of the liquid crystal panel 2 is fixed in the third embodiment, the positional adjustment of the optical unit 28 in the horizontal direction according to the actual span of eyes of the user will change the relative distance between the liquid crystal panel 2 and the lens 26. This results in varying the distance from the eye of the user to the virtual image. In order to prevent this problem, either the liquid crystal panel 2 or the lens 26 may be moved along its optical axis with the movement of the optical unit 28, to thereby fix the distance from the eye of the user to a virtual image. Another possible structure is to enlarge the exit pupil of the lens 26 while fixing the position of the optical unit 28 in front of either the left eye or the right eye, so as to account for the difference in the span of eyes among individuals.

Figure 8A:
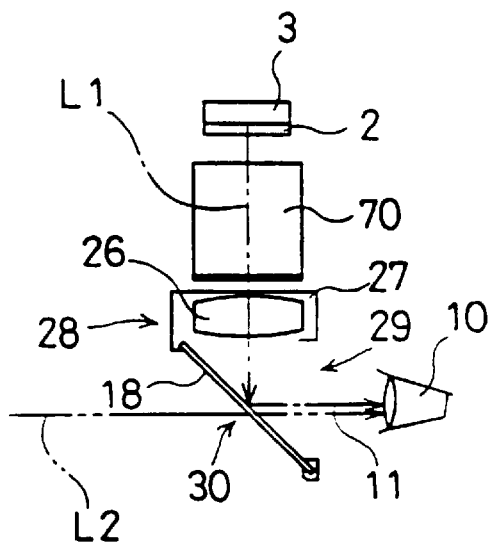
FIGS. 8A, 8B, and 8C illustrate the structure of an optical system in a fourth embodiment according to the present invention.
Figure 8B:
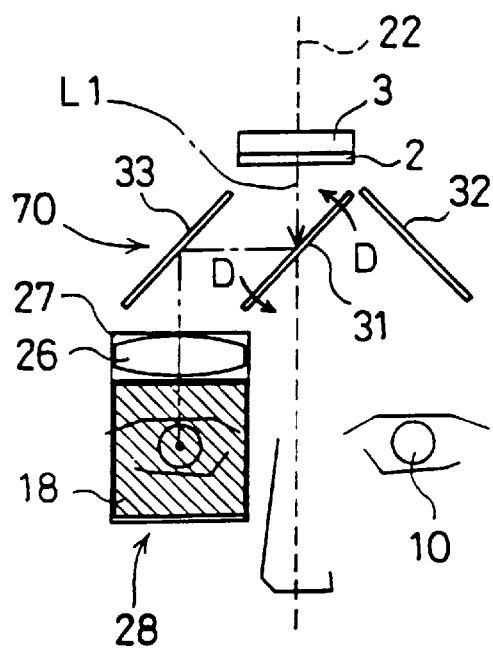
Figure 8C:
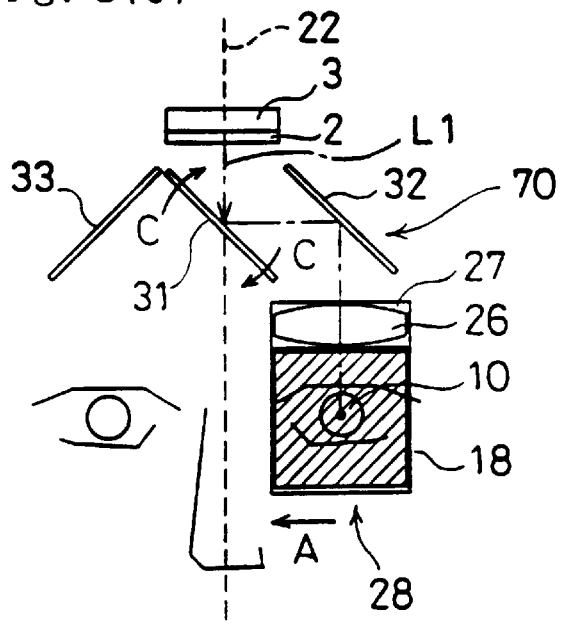

FIG. 8(*a*) is a side view illustrating an optical system of a fourth embodiment according to the present invention; FIG. 8(*b*) is a front view showing a first state in which the user observes a virtual image with the left eye in the fourth embodiment; and FIG. 8(*c*) is a front view showing a second state in which the user observes a virtual image with the right eye.

The optical system shown in FIG. 8(*a*) includes another reflection unit 70 in place of the reflection unit 50 of the third embodiment shown in FIG. 5(*a*). As shown in FIGS. 8(*b*) and 8(*c*), the reflection unit 70 has three reflecting mirrors 31 through 33. The first reflecting mirror is arranged on the center line 22. The second and the third reflecting mirrors 32 and 33 are arranged, respectively, a little above and in front of the left eye and the right eye to be symmetrical with respect to the center line 22. The second and the third reflecting mirrors 32 and 33 are inclined inward by approximately 45 degrees from the vertical direction.

The first reflecting mirror 31 is rotatable either in the direction of arrows C in FIG. 8(*b*) or in the direction of arrows D in FIG. 8(*c*) about a rotational axis arranged on the center line 22. The rotation switches the state between the two states of FIGS. 8(*b*) and 8(*c*). In the first state of FIG. 8(*b*), the first reflecting mirror 31 reflects the image beam L1 in the direction of the second reflecting mirror 32, and the light beam reflected by the second reflecting mirror 32 enters the optical unit 28. In the second state of FIG. 8(*c*), on the other hand, the first reflecting mirror 31 reflects the image beam L1 in the direction of the third reflecting mirror 33, and the light beam reflected by the third reflecting mirror 33 enters the optical unit 28. The rotational angle of the reflecting mirror 31 for a switch between the states of FIGS. 8(*b*) and 8(*c*) can be made 90 degrees if both surfaces of the first reflecting mirror 31 are formed as reflection planes and if the rotation direction of the reflecting mirror 31 is reversible.

Figure 9:
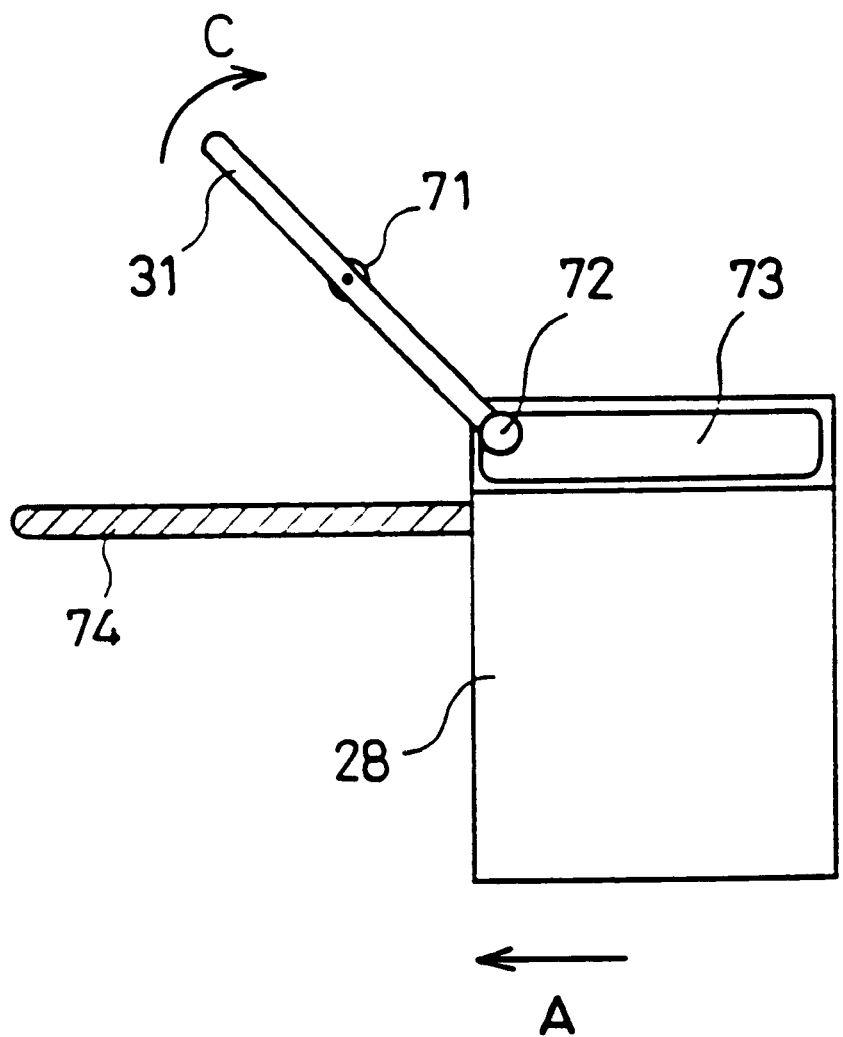
FIG. 9 illustrates the structure of a shape changing mechanism in the fourth embodiment.

FIG. 9 shows a shape changing mechanism for rotating the reflecting mirror 31 with the movement of the optical unit 28. In this example, the reflecting mirror 31 has reflection planes on both surfaces thereof. The center of the reflecting mirror 31 is rotatably supported by a supporting pin 71 disposed in the main case 14 (see FIG. 4). Another pin 72 is disposed on the lower end of the reflecting mirror 31. This pin 72 is slidably fitted in a cam slot 73 formed in the rear face of the optical unit 28. The cam slot 72 extends in the horizontal direction and the pin 72 is guided along the cam slot 73 to be movable in the horizontal direction. Since a rotation of the reflecting mirror 31 changes the vertical position of the pin 72, the cam slot 73 has a width in the vertical direction that covers the range of the vertical position of the pin 72. The optical unit 28 is slidably fitted in a groove 74 formed in the main case 14 by means of a non-illustrated pin.

In the first state shown in FIG. 8(*b*), the shape changing mechanism is set at the position shown in FIG. 9. When a force is applied in the direction of an arrow A to the optical unit 28 in the state of FIG. 9, the optical unit 28 moves along the groove 74. At the initial stage of the movement, the pin 72 is made free in the cam slot 73, which results in no rotation of the reflecting mirror 31. A further movement of the optical unit 28 causes the pin 72 to be pressed against the end portion of the cam slot 73, and the force applied from the optical unit 28 rotates the first reflecting mirror 31 in the direction of the arrow C. The optical unit 28 accordingly moves to the position in front of the right eye to realize the second state shown in FIG. 8(*c*). Namely the direction of reflection at the first reflecting mirror 31 is changed from leftward to rightward. As discussed in the third embodiment, the user can observe a virtual image in the same direction both in the first state and in the second state. Reverse operations and movements are carried out for changing the eye observing the virtual image from the right eye to the left eye.

As discussed above, the fourth embodiment has the same effects as those of the third embodiment and further simplifies the deformation mechanism of the reflection unit (that is, the shape changing mechanism), thereby simplifying the structure of the switching device for changing the eye for observation of a virtual image. Compared with this fourth embodiment, the third embodiment discussed above advantageously uses a smaller number of reflecting mirrors in the reflection unit.

FIG. 10(*a*) is a side view illustrating a fifth embodiment according to the present invention; FIG. 10(*b*) is a front view showing a first state in which the user observes a virtual image with the left eye; and FIG. 10(*c*) is a front view showing a second state in which the user observes a virtual image with the right eye.

Figure 10A:
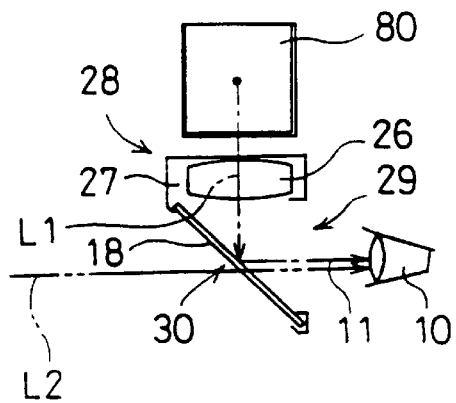
FIGS. 10A, 10B, and 10C illustrate the structure of an optical system in a fifth embodiment according to the present invention.
Figure 10B:
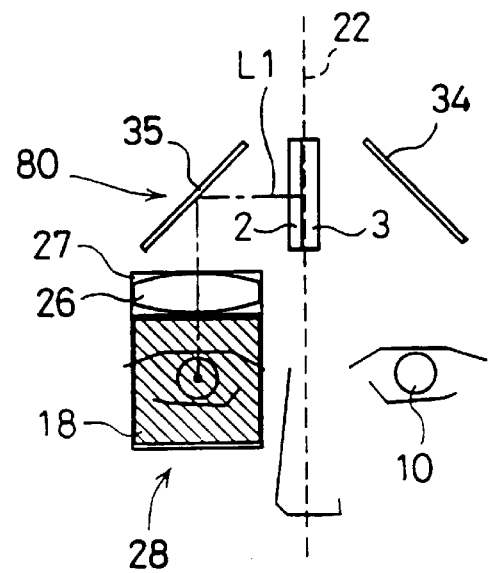
Figure 10C:
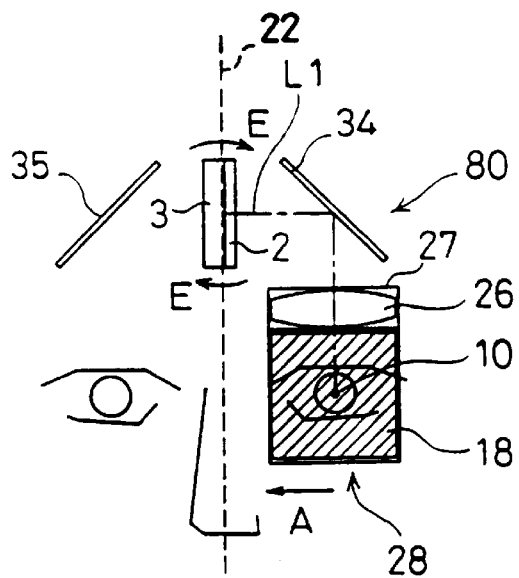

The optical system shown in FIGS. 10(a) through 10(c) has the liquid crystal panel 2 and the back light 3 disposed at different positions from those in the optical system of the fourth embodiment shown in FIG. 8(a) and includes another reflection unit 80 in place of the reflection unit 70. As shown in FIGS. 10(b) and 10(c), the liquid crystal panel 2 and the back light 3 are arranged in the vicinity of the center line 22 of the width to make the normal of the image forming surface of the liquid crystal panel 2 face substantially in the horizontal direction. The reflection unit 80 includes two reflecting mirrors 34 and 35 arranged to be symmetrical with respect to the center line 22. The two reflecting mirrors 34 and 35 are inclined inward by approximately 45 degrees from the normal of the display surface of the liquid crystal panel 2 and deflect the image beam L1 emitted in the substantially horizontal direction from the liquid crystal panel 2 vertically downward.

In the fifth embodiment, the liquid crystal panel 2 and the back light 3 are held to be integrally rotatable. A rotation of the liquid crystal panel 2 and the back light 3 switches the current state between the first state shown in FIG. 10(b) and the second state shown in FIG. 10(c). The rotational axis of the liquid crystal panel 2 exists on the optical axis passing through the center of the image forming surface of the liquid crystal panel 2. This enables the distances from the image forming surface of the liquid crystal panel 2 to the two reflecting mirrors 34 and 35 to be identical with each other both in the first state and in the second state.

When a force is applied in the direction of an arrow A to the optical unit 28 in the first state of FIG. 10(b), the optical unit 28 moves along a non-illustrated rail disposed between the optical unit 28 and the reflection unit 80. In mid course of the movement, the force applied from the optical unit 28 integrally rotates the liquid crystal panel 2 and the back light 3 in the direction of an arrow E, so as to realize the second state shown in FIG. 10(c). Namely the direction of the image beam L1 emitted from the liquid crystal panel 2 is changed from leftward to rightward, and the image beam L1 is thus reflected downward by the first reflecting mirror 35 to enter the optical unit 28. Reverse operations and movements are carried out for changing the eye observing the virtual image from the right eye to the left eye.

Figure 11A:
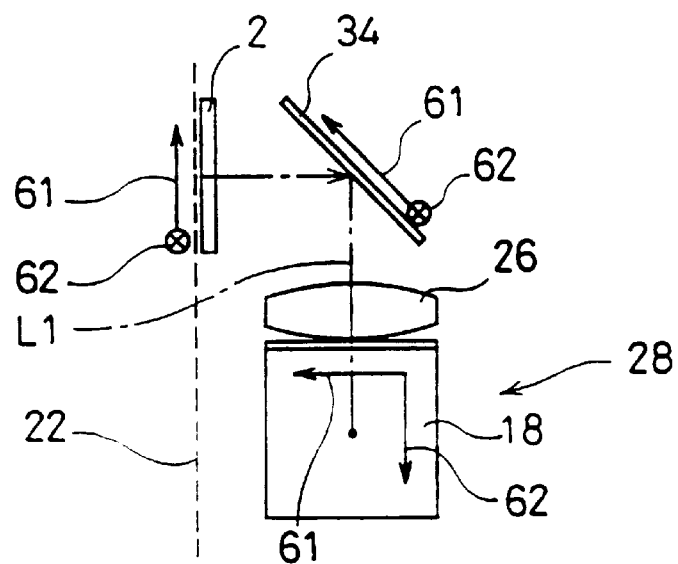
FIGS. 11A and 11B show the states of forming images in the fifth embodiment.
Figure 11B:
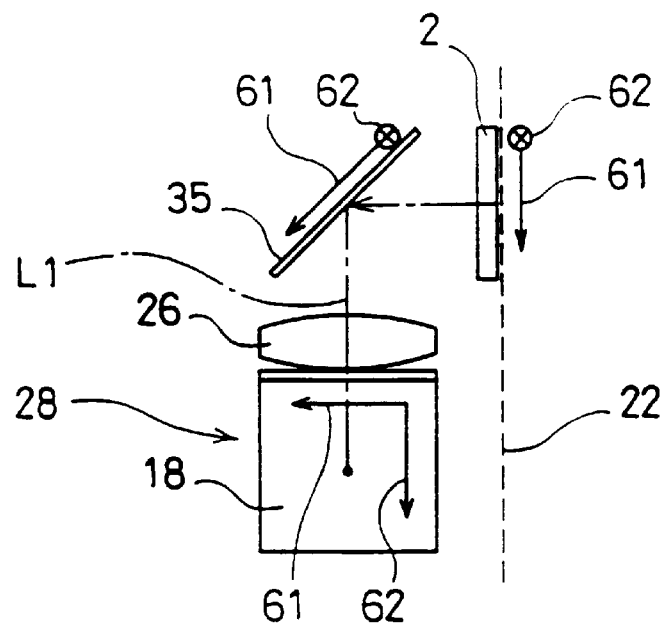

FIG. 11 illustrates the fact that the user can observe a virtual image of the same orientation both in the first state of FIG. 10(b) and in the second state of FIG. 10(c). The first direction 61 is equivalent to the first coordinate axis of the image forming surface of the liquid crystal panel 2, whereas the second direction 62 is equivalent to the second coordinate axis of the image forming surface. As clearly understood from FIGS. 11(a) and 11(b), each image formed on the liquid crystal panel 2 is reflected twice and observed as an image of the same orientation with either the left eye or the right eye. In this structure, an electrical switching operation regarding the orientation of the display image is not required when changing the eye for observing the virtual image.

As discussed above in the fifth embodiment, only the lens 26 and the half mirror 18 are moved substantially along the width of the user's eyes to change the direction of emission of the image beam L1 from the liquid crystal panel 2, thereby changing the eye for observing a virtual image. This simplifies the structure of the reflection unit. The arrangement of the liquid crystal panel 2 housed in the reflection unit 80 effectively reduces the size of the apparatus.

Figure 12:
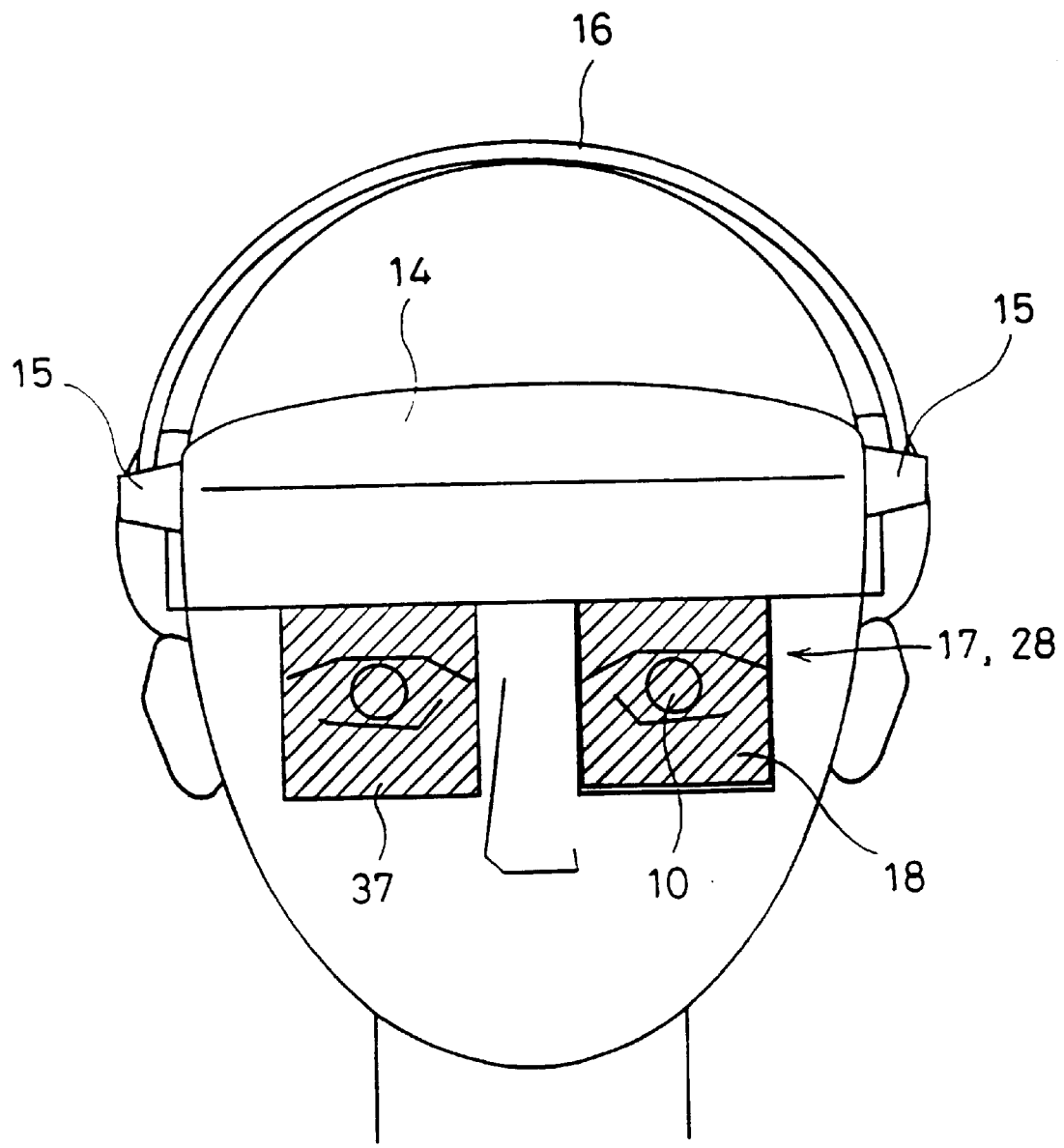
FIG. 12 shows the appearance of a sixth embodiment according to the present invention.

FIG. 12 shows a sixth embodiment according to the present invention. The HMD shown in FIG. 12 has any one of the optical systems discussed in the second through fifth embodiments. The difference from the HMD of the second embodiment shown in FIG. 4 is that the HMD of the sixth embodiment shown in FIG. 12 includes a partially transparent screen plate 37, which has substantially the same transmittance as that of the half mirror 18 and is arranged in front of the eye that does not see a virtual image. The partially transparent screen plate 37 is detachably attached to the main case 14 and may be disposed in front of either the left eye or the right eye of the user. The user detaches the partially transparent screen plate 37 from the main case 14 and moves the optical unit 17 (or 28) in order to change the eye which observes the virtual image. The partially transparent screen plate 37 is then attached again to the main case 14 to be located in front of the eye that does not see a virtual image.

It is preferable that the transmittance of the partially transparent screen plate 37 is set substantially equal to the transmittance of the half mirror 18. For example, as discussed in the second embodiment, the difference in brightness between the left and the right visual fields is preferably not greater than 30%. Regulation of the transmittance of the partially transparent screen plate 37 in the range from about 0.7 times to 1.3 times the transmittance of the half mirror 18 enables the brightness of the background image observed through the half mirror 18 to be substantially coincident with the brightness of the background image observed through the partially transparent screen plate 37. The user can thus naturally observe the background image. This structure has a more flexible requirement for the transmission/reflection characteristics of the half mirror 18 than that of the second embodiment, and adjustment of these characteristics enables the relationship of brightness between the display image and the background image to be set arbitrarily.

Figure 13A:
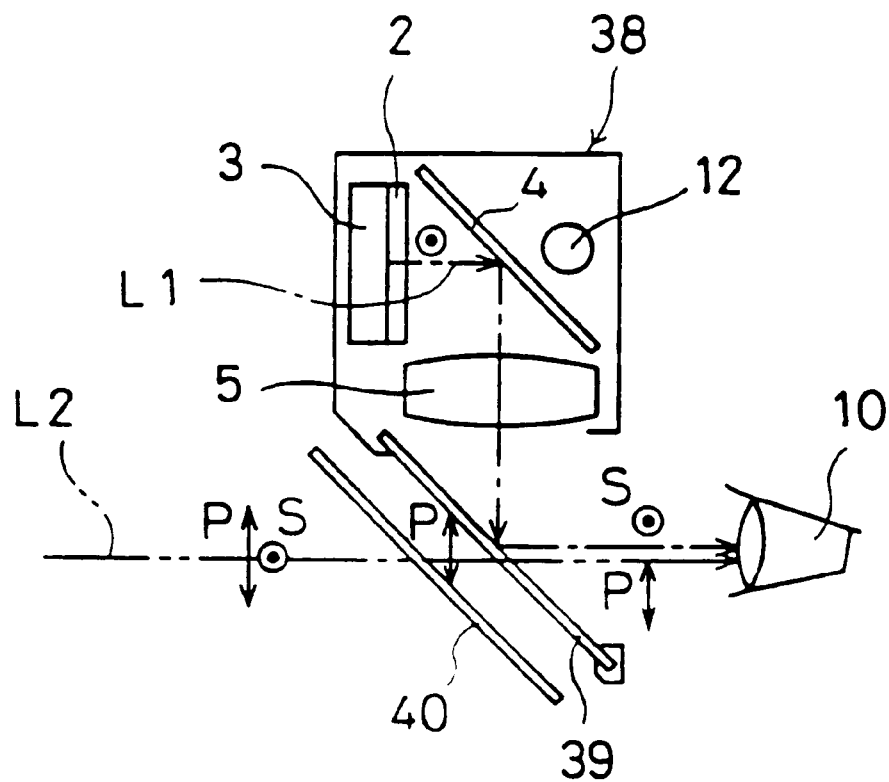
FIGS. 13A and 13B illustrate the structure of an optical system in a seventh embodiment according to the present invention.

FIG. 13(a) is a side view illustrating a seventh embodiment according to the present invention. An optical unit 38 shown in FIG. 13(a) has a polarizing beam splitter 39 in place of the half mirror 18 included in the optical unit 17 of the second embodiment shown in FIG. 3, and further includes a partially transparent screen plate 40 having polarization selectivity in front of the polarizing beam splitter 39. In the specification, the term 'polarization selectivity' implies the property of transmitting or reflecting a specific polarized light component.

The liquid crystal panel 2 has polarizing plates (not shown) on the light-receiving surface and the light-emitting surface thereof. In the seventh embodiment, the image beam L1 emitted from the liquid crystal panel 2 is s-polarized light having a plane of vibrations perpendicular to the light-receiving surfaces of the reflecting mirror 4 and the polarizing beam splitter 39 (that is, the plane parallel to the sheet surface). In the drawings of FIG. 13, each open circle with a black point drawn in the vicinity of a luminous flux shows that the luminous flux is s-polarized light. Each line segment with double arrows, on the other hand, shows that the luminous flux is p-polarized light.

The polarizing beam splitter 39 has the characteristics of reflecting the s-polarized light while transmitting the p-polarized light whose plane of vibrations is perpendicular to that of the s-polarized light. The polarizing beam splitter 39 has the size covering the visual field of a virtual image for a single eye of the user. Like the half mirror 8 shown in FIG. 2, the partially transparent screen plate 40 has a size and shape covering the visual field of virtual images for both eyes of the user. The partially transparent screen plate 40 includes, for example, a polarizing plate, and has the characteristics of selectively transmitting only the p-polarized light.

As shown in FIG. 13(a), the image formed by the liquid crystal panel 2 is illuminated from the rear side by the back light 3, and the image beam L1 of s-polarized light is emitted accordingly. After deflection of the optical path by approximately 90 degrees by the reflecting mirror 4, the image beam L1 is refracted by the lens 5. The image beam L1 of s-polarized light is reflected almost 100% by the polarizing beam splitter 39 and forms an image in the eye 10 of the user.

The background beam L2 is, on the other hand, non-polarized light which include p-polarized light and s-polarized light. The partially transparent screen plate 40 transmits only the p-polarized light component of the background beam L2, and the p-polarized light subsequently enters the polarizing beam splitter 39. The polarizing beam splitter 39 has the characteristic of transmitting the p-polarized light almost 100%, and thus outputs the p-polarized light component of the background beam L2 without any significant reflection or absorption. Almost 100% of the p-polarized light component of the light beam L2 from the background view reaches the eye of the user for observing a virtual image. As a result, the image beam L1 of s-polarized light and the background beam L2 of p-polarized light simultaneously enter the eye so that a virtual image can be observed. The user can thus observe a composite image, that is, a combination of the display image with the background image.

Figure 13B:
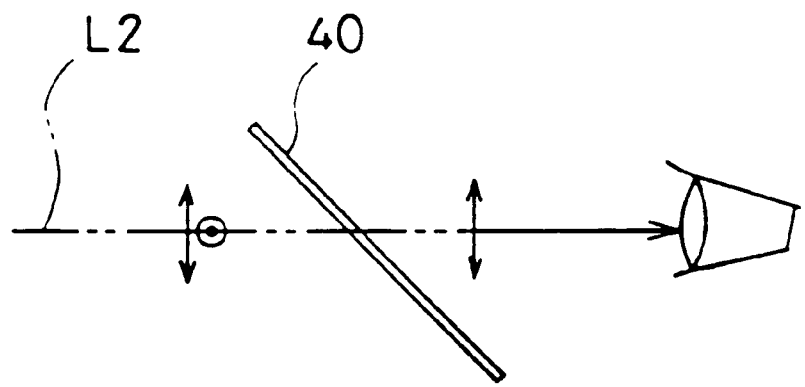

FIG. 13(b) shows the state in which the partially transparent screen plate 40 is disposed in front of the eye that does not see a virtual image. This configuration enables almost 100% of the p-polarized light component of the light beam L2 from the background to enter the eye that does not see a virtual image.

In the seventh embodiment, most of the image beam L1 from the liquid crystal panel 2 is reflected by the polarizing beam splitter 39 and enters the eye 10. This significantly improves the brightness of the display image observed by the user. Since the brightness of the background image entering the eye that sees a virtual image substantially coincides with the brightness of the background image entering the eye that does not see a virtual image, the user can naturally observe the background image. Like the sixth embodiment, since the seventh embodiment enables the left eye and the right eye of the user to see the background images of substantially the same brightness, and the degree of freedom is remarkably to improved with respect to brightness between the display image and the background image. Specifically, adjustment of the transmission/reflection characteristics of the partially transparent screen plate 40 enables the relationship of brightness between the display image and the background image to be set arbitrarily. Since the partially transparent screen plate 40 is arranged outside the polarizing beam splitter 39 and fixed to the main case and has a size covering the visual field of a virtual image for both eyes of the user, the partially transparent screen plate 40 does not affect the switching operation for changing the eye which observes the virtual image.

The polarizing beam splitter 39 and the partially transparent screen plate 40 of the seventh embodiment are not restricted to the arrangement of the optical system discussed in the second embodiment, but are also applicable to the other arrangements of the optical system discussed in the third through fifth embodiments.

As understood from the discussion of the seventh embodiment, the image combining device for combining the image beam L1 with the background beam L2 can be implemented by a variety of semi-transmission mirrors, such as a half mirror and a polarizing beam splitter. The semi-transmission mirrors here include not only those with polarization selectivity, such as a polarizing beam splitter, but those without polarization selectivity, such as a half mirror.

The partially transparent screen plate disposed in front of the eye that does not see a virtual image may be a semi-transparent member with polarization selectivity or a semi-transparent member without polarization selectivity.

The image combining device used in the seventh embodiment is the polarizing beam splitter that enables the image beam L1 to enter the eye of the user without any significant decrease in quantity of light. Since the polarizing plate having a size that covers the visual field of a virtual image for both eyes is used as the partially transparent screen plate, the background image is well balanced with the display image irrespective of the selection of the eye which observes the virtual image.

Figure 14:
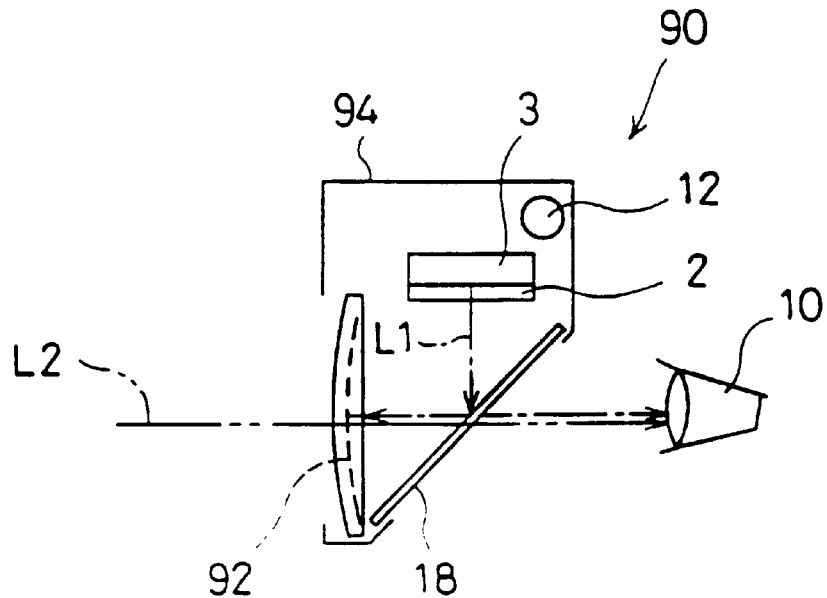
FIG. 14 illustrates the structure of an optical system in an eighth embodiment according to the present invention.

FIG. 14 illustrates the structure of an eighth embodiment according to the present invention. An optical unit 90 includes a liquid crystal panel 2, back light 3, a planar half mirror 18, a concave half mirror 92, and a casing 94 for accommodating these components therein. The concave half mirror 92 is arranged to be opposite to the user across the planar half mirror 18. The concave half mirror 92 is used instead of the lens as the magnifying optical device. The mechanism for moving the optical system in this embodiment may be identical with the mechanism in the second embodiment or that in the seventh embodiment and thus is not specifically described here.

The liquid crystal panel 2 is arranged face down above the plane half mirror 18. Part of the image beam L1 emitted from the liquid crystal panel 2 is reflected by the planar half mirror 18 to be deflected toward the concave half mirror 92. The image beam L1 is then reflected by the inner surface of the concave half mirror 92 and passes through the planar half mirror 18 to enter the eye 10 of the user. Since the inner surface of the concave half mirror forms a concavity, the image represented by the image beam L1 reflected from the concavity is magnified to create a virtual image to be observed.

Part of the background beam L2, on the other hand, passes through the concave half mirror 92 and the planar half mirror 18 to enter the eye 10 of the user. The concave half mirror 92 has a uniform thickness and accordingly, transmits most of the light beam L2 from the background without refraction. The user can thus observe the intact background image with the magnified virtual image of the display image displayed on the liquid crystal panel 2.

The eighth embodiment does not have any lens between the liquid crystal panel 2 and the planar half mirror 18 and can therefore decrease the distance between the liquid crystal panel 2 and the planar half mirror 18. This configuration effectively reduces the size of the whole optical system. Furthermore, the use of the concave mirror in place of the lens decreases the optical aberration.

Figure 15:
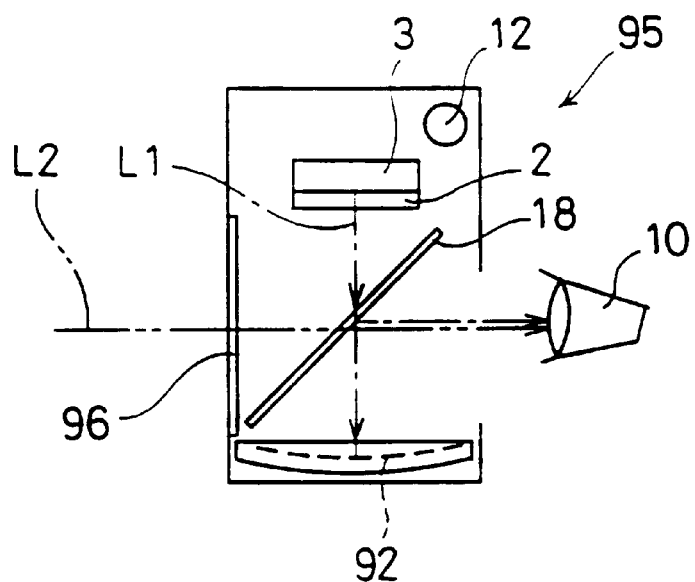
FIG. 15 illustrates the structure of an optical system in a ninth embodiment according to the present invention.

FIG. 15 illustrates the structure of a ninth embodiment according to the present invention. An optical unit 95 has a concave half mirror 92 disposed at a different position from that in the eighth embodiment shown in FIG. 14, and further includes a partially transparent screen plate 96. The concave half mirror 92 is arranged to be opposite the liquid crystal panel 2 across the plane half mirror 18. The partially transparent screen plate 96 is arranged to be opposite the user across the planar half mirror 18.

Part of the image beam L1 emitted from the liquid crystal panel 2 passes through the planar half mirror 18, is reflected by the inner surface of the concave half mirror 92, and is reflected again by the planar half mirror 18 to enter the eye 10 of the user. The concave half mirror 92 has the function of a magnifying optical device, as in the eight embodiment shown in FIG. 14.

Part of the background beam L2, on the other hand, passes through the partially transparent screen plate 96 and the planar half mirror 18 to enter the eye 10 of the user.

Like the eighth embodiment shown in FIG. 14, the ninth embodiment has the advantages of reducing the size of the whole optical system and decreasing the optical aberration. An additional advantage of the ninth embodiment is that adjustment of the transmittance of the partially transparent screen plate 96 can control the brightness of the background image. For example, adjustment of the transmittance of the partially transparent screen plate 96 to a relatively high level improves the brightness of the background image.

The partially transparent screen plate 96 shields part of the background beam L2, which accordingly decreases the quantity of the background beam L2 which is reflected by the planar half mirror 18 to the liquid crystal panel 2. This reduces the glare on the surface of the liquid crystal panel 2.

A concave mirror may be used instead of the concave half mirror 92. The concave mirror has a higher reflectivity than that of a concave half mirror and thus enhances the brightness of the display image observed with the eye 10.

Figure 16A:
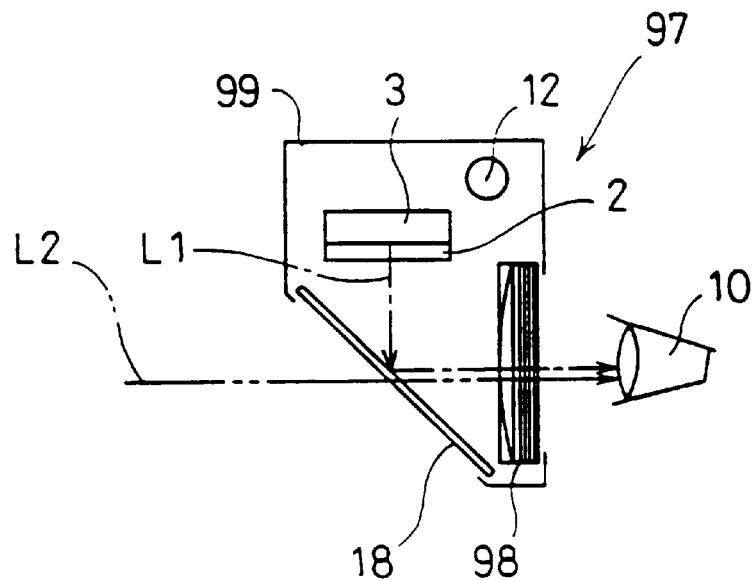
FIGS. 16A and 16B illustrate the structure of an optical system in a tenth embodiment according to the present invention.

FIG. 16(a) illustrates the structure of a tenth embodiment according to the present invention. An optical unit 97 includes a liquid crystal panel 2, back light 3, half mirror 18 internal reflection-type magnifying optical system 98, and casing 99 for accommodating these components therein.

The internal reflection-type magnifying optical system 98 is interposed between the half mirror 18 and the user. Part of the image beam L1 emitted from the liquid crystal panel 2 is reflected by the half mirror 18 toward the user and enters the internal reflection-type magnifying optical system 98.

The internal reflection-type magnifying optical system 98 is generally called a 'pancake window' and has the function of optically magnifying an image through the repeated internal reflection of light. The structure and the function of the internal reflection-type magnifying optical system 98 is described in U.S. Reissue Pat. No. 27,356, the disclosure of which is herein incorporated by reference.

Figure 16B:
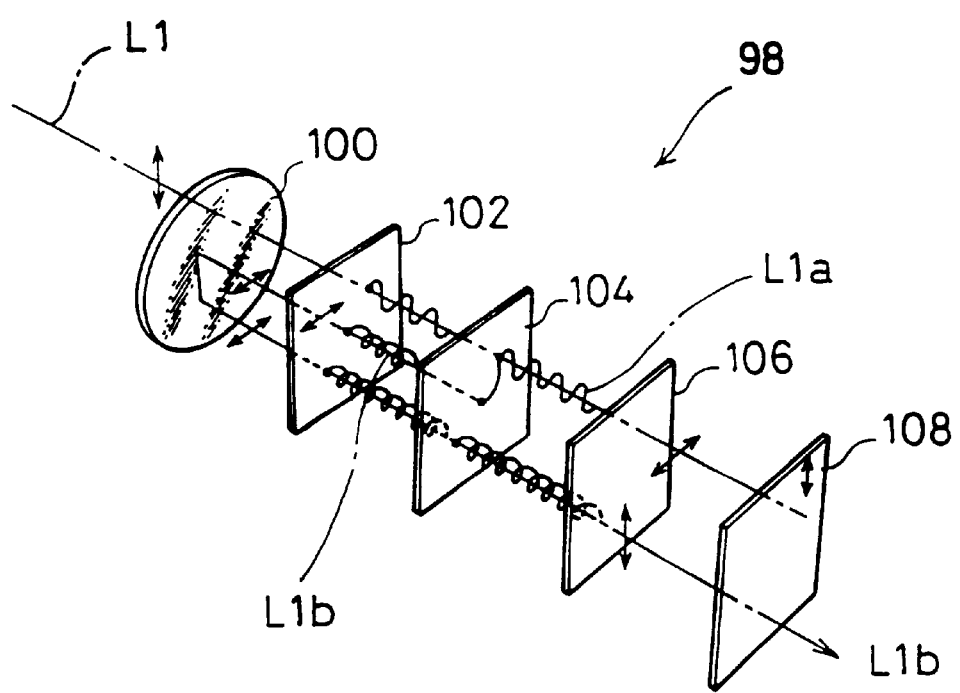

FIG. 16(b) is a decomposed perspective view showing the internal reflection-type magnifying optical system described in U.S. Reissue Pat. No. 27,356. The internal reflection-type magnifying optical system 98 includes a concave half mirror 100, a first $\lambda/4$ wave plate 102, a planar half mirror 104, a second $\lambda/4$ wave plate 106, and a polarizing plate 108 stacked in this sequence. As clearly understood from FIG. 16(a), the distances between the respective optical elements in the internal reflection-type magnifying optical system 98 are exaggerated in FIG. 16(b) to clarify the optical path.

The image beam L1 reflected by the planar half mirror 18 enters the concave half mirror 100. In the drawing of FIG. 16(b), the line segment with double arrows denotes the direction of vibration of the vibrational vector of linear polarized light and the spiral denotes the direction of rotation of the vibrational vector of circular polarized light.

Since a polarizing plate is disposed on the light-emitting surface of the liquid crystal panel 2, the image beam L1 entering the concave half mirror 100 is linear polarized light. The image beam L1 passes through the concave half mirror 100 and is converted to circular polarized light by the first $\lambda/4$ wave plate 102. The image beam L1 of circular polarized light is divided into a first luminous flux L1a passing through the planar half mirror 104 and a second luminous flux L1b reflected by the planar half mirror 104. The first luminous flux L1a is converted to linear polarized light by the second $\lambda/4$ wave plate 106. The direction of vibration of the vibrational vector of this linear polarized light is perpendicular to the direction of vibration of the original image beam L1. The first luminous flux L1a output to from the second $\lambda/4$ wave plate 106 is shielded by the polarizing plate 108 and does not reach the eye 10 of the user. The polarizing plate 108 selectively transmits the linear polarized light having a direction of vibration identical with that of the image beam L1 entering the concave half mirror 100, while shielding the linear polarized light having a direction of vibration perpendicular to that of the image beam L1.

The second luminous flux L1b reflected from the planar half mirror 104, on the other hand, again passes through the first $\lambda/4$ wave plate 102 to be converted to linear polarized light and is reflected from the inner surface of the concave half mirror 100. The direction of vibration of the vibrational vector of the second luminous flux L1b is perpendicular to the direction of vibration of the image beam L1 entering the concave half mirror 100 from the outside. The second luminous flux L1b is refracted when being reflected by the concave half mirror 100. This magnifies the display image to create a magnified virtual image.

The second luminous flux L1b reflected by the inner surface of the concave half mirror 100 is again converted to circular polarized light by the first $\lambda/4$ wave plate 102 and enters the planar half mirror 104. The second luminous flux L1b passing through the planar half mirror 104 is converted to linear polarized light by the second $\lambda/4$ wave plate 106. The second luminous flux L1b passing through the second $\lambda/4$ wave plate 106 passes through the polarizing plate 108 and reaches the eye 10 of the user. Since the second luminous flux L1b is magnified to a magnified virtual image when being reflected from the inner surface of the concave half mirror 100, the user can observe the magnified virtual image.

Other than the second luminous flux L1b shown in FIG. 16(b), there are luminous fluxes that repeat the greater number of internal reflections before entering the eye of the user. Such other luminous fluxes, however, have a significantly lower quantity of light than that of the second luminous flux L1b, due to the loss primarily in the half mirrors 100 and 104. The effects of these other luminous fluxes entering the eye of the user are thus negligible.

The background beam L2 includes random polarized light components, and the polarized light component of the background beam L2 crossing the image beam L1 passes through the respective optical elements in the internal reflection-type magnifying optical system 98 and reaches the eye 10 of the user. The user observes the intact background image that is not subjected to the magnification. Part of the background beam L2 follows an optical path that is similar to the optical path of the first luminous flux L1b shown in FIG. 16(b) and forms an image in the vicinity of the eye 10. Since the light source of the background beam L2 is generally far from the focus of the concave half mirror 100, however, the position of imaging is closer to the eye than the nearest point of the eye (that is, the nearest position at which the eyes can see an object in focus). The user accordingly does not perceive the magnified virtual image of the background view.

When another type of image display device for emitting a light beam which is not linear polarized light is used instead of the liquid crystal panel 2, a polarizing plate may be disposed on the side of the light-receiving surface of the concave half mirror 100 shown in FIG. 16(b).

Like the eighth and the ninth embodiments, the tenth embodiment effectively reduces the size of the whole optical system and decreases the optical aberration.

In the eighth through tenth embodiments with the concave mirror, the planar half mirror 18 may have a size which covers the visual field of virtual images for both eyes. Furthermore, any one of the structures discussed in the first through the fifth embodiments is applicable to the switching device for changing the eye which observes the virtual image in the eighth through tenth embodiments.

Figure 17A:
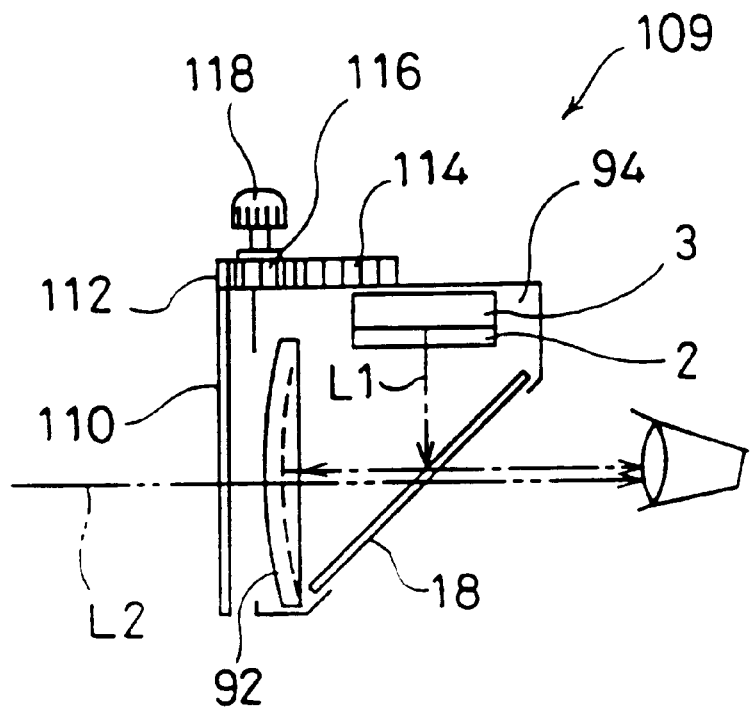
FIGS. 17A and 17B illustrate the structure of an optical system in an eleventh embodiment according to the present invention.

FIG. 17(a) illustrates the structure of an eleventh embodiment according to the present invention. An optical system 109 includes the elements described below in addition to the optical unit 90 of the eighth embodiment shown in FIG. 14. A partially transparent screen plate 110 is disposed in front of the concave half mirror 92. The upper end of the partially transparent screen plate 110 is connected with a first rack 112, whereas the upper end of the casing 94 of the optical unit is connected to a second rack 114. The bearing 12 shown in FIG. 14 is omitted from the optical system 109 of FIG. 17.

Figure 17B:
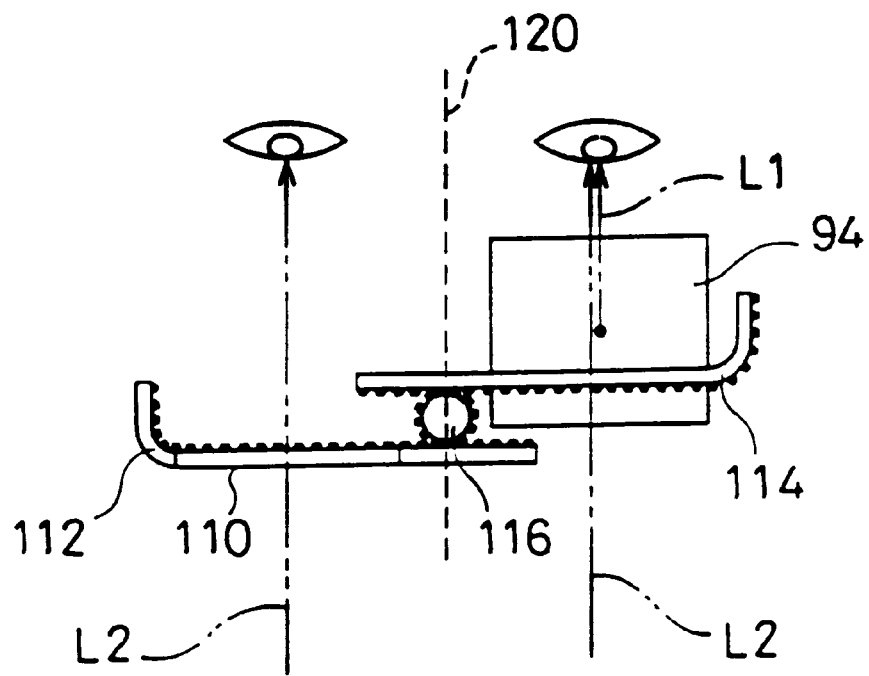

FIG. 17(b) shows the optical system 109. The opposite surfaces of the two racks 112 and 114 have teeth formed therein. A pinion 116 is interposed between the two racks 112 and 114, and the teeth of the pinion 116 engage with the teeth of the two racks 112 and 114. As shown in FIG. 17(a), a knob 118 for rotating the pinion 116 is disposed above the pinion 116.

The main case 14 and the attachment 16 shown in FIG. 12 can be used in this eleventh embodiment. The two racks 112 and 114 are slidably movable while being guided by non-illustrated grooves formed in the main case 14. As shown in FIG. 17(b), the two racks 112 and 114 are flexible, and move along the grooves of the main case 14 while bending.

The pinion 116 is held by the main case 14 to allow rotation of the pinion 116. When the user rotates the knob 118, the two racks 112 and 114 move in reverse directions with the rotation of the pinion 116. Referring again to FIG. 17(b), the optical unit 109 and the partially transparent screen plate 110 are arranged to be substantially symmetrical with respect to a center line 120. The movements of the two racks 112 and 114 shift the optical unit 109 and the partially transparent screen plate 110 in opposite directions while keeping a substantially symmetrical relationship. The user can set the optical unit 109 and the partially transparent screen plate 110 at appropriate positions corresponding to the span of eyes of the user through the operation of the knob 118. Since the two racks 112 and 114 move without any interference, the horizontal positions of the optical unit 109 and the partially transparent screen plate 110 may be exchanged through the operation of the knob 118.

As discussed above, the eleventh embodiment has the mechanism for shifting the optical unit 109 and the partially transparent screen plate 110 in opposite directions while keeping a substantially symmetrical relationship therebetween. This structure accordingly does not require any operation for detaching the partially transparent screen plate 110 in the process of changing the eye for observation of a virtual image. This structure also advantageously facilitates positional adjustment according to the span of eyes of the user. This shifting mechanism is applicable not only when the concave half mirror is used as the magnifying optical system, but when the lens is used as the magnifying optical system (for example, the second embodiment shown in FIGS. 3 and 4). Even when the optical system does not include the partially transparent screen plate 110, the shifting mechanism shown in FIG. 17 is usable as the switching device for shifting the optical unit in the horizontal direction and changing the eye for observation of a virtual image.

Figure 18A:
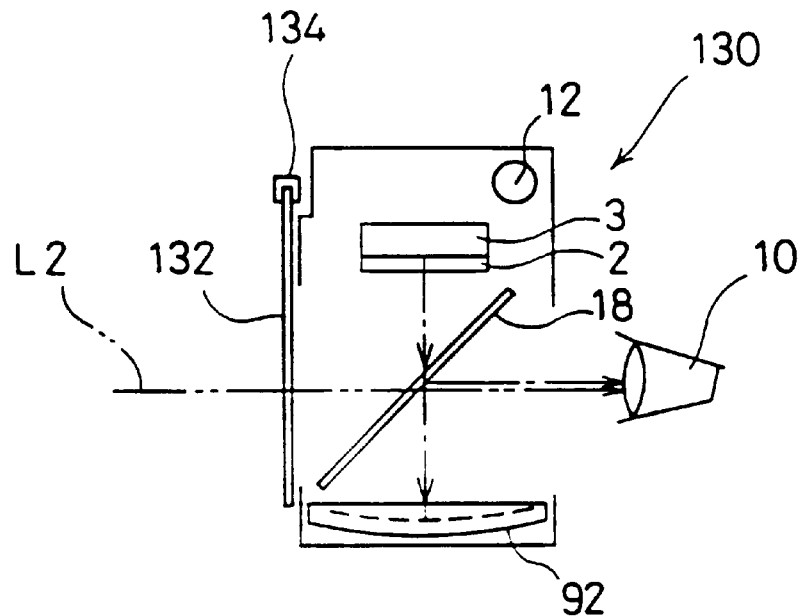
FIGS. 18A and 18B illustrate the structure of an optical system in a twelfth embodiment according to the present invention.

FIG. 18(a) illustrates the structure of an optical system of still another HMD as a twelfth embodiment according to the present invention. This optical system includes an optical unit 130, which is almost identical with the optical unit 95 of the ninth embodiment shown in FIG. 15 except the partially transparent screen plate 96 for a single eye is replaced by a partially transparent screen plate 132 for both eyes. The partially transparent screen plate 132 is detachably fitted in a groove 134 formed in a main case. The groove 134 is formed, for example, in the main case 14 shown in FIG. 12.

Figure 18B:
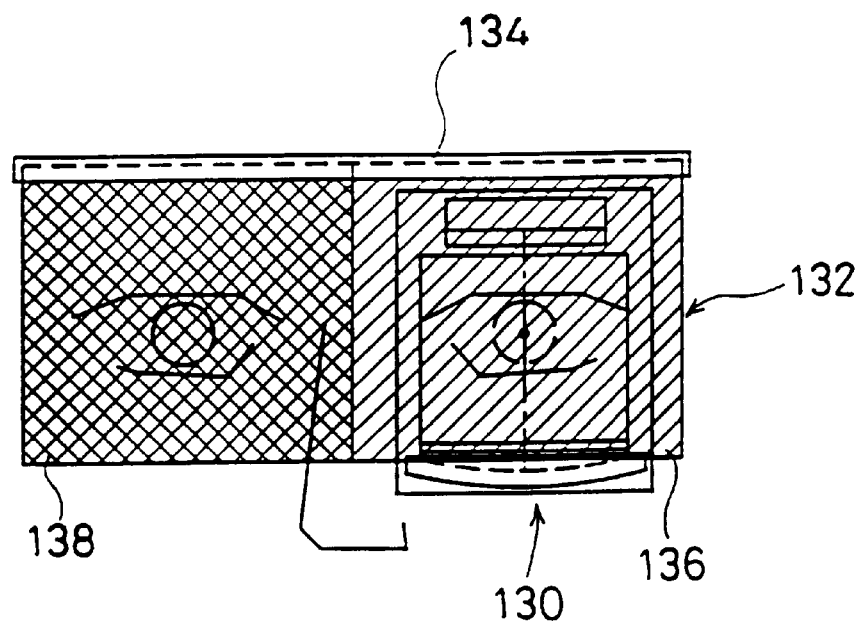

FIG. 18(b) is a front view showing the optical system of the twelfth embodiment. The partially transparent screen plate 132 is divided by the approximate center into two sections 136 and 138. The first section 136 is arranged in front of the optical unit 130 and has a relatively high transmittance. The second section 138 is arranged in front of the eye at which the optical unit 10 is not disposed, and has a relatively low transmittance. Because of the reason discussed in the second embodiment, a difference of transmittance between the first section 136 and the second section 138 is preferably set such that the difference between the total transmittance of the first section 136 and the half mirror 18 and the transmittance of the second section 138 is not greater than approximately 30%. The partially transparent screen plate 132 may have a notch for the nose on the center thereof, in the same manner as the half mirror 18 shown in FIG. 2.

The optical unit 130 shown in FIG. 18(a) is moved between the left position and the right position by a mechanism similar to that discussed in FIG. 2. The user removes the integral unit of the partially transparent screen plate 132 from the groove 134 and turns it over to re-insert it into the groove 134 to change the positions of the first section 136 and the second section 138. Such operation enables the section 136 having a relatively high transmittance to be located in front of the eye with the optical unit 130, while locating the section 138 having a relatively low transmittance in front of the other eye. This reduces the difference in brightness between the light beams entering the left eye and the right eye.

The first section 136 and the second section 138 of the partially transparent screen plate 132 may be separated from each other. The separation enables these sections 136 and 138 to be independently removed from the groove 134 and re-inserted into the groove 134 after the change of positions. This structure does not require any operation for turning over the two sections 136 and 138, but increases the steps of attachment and detachment.

Figure 19:
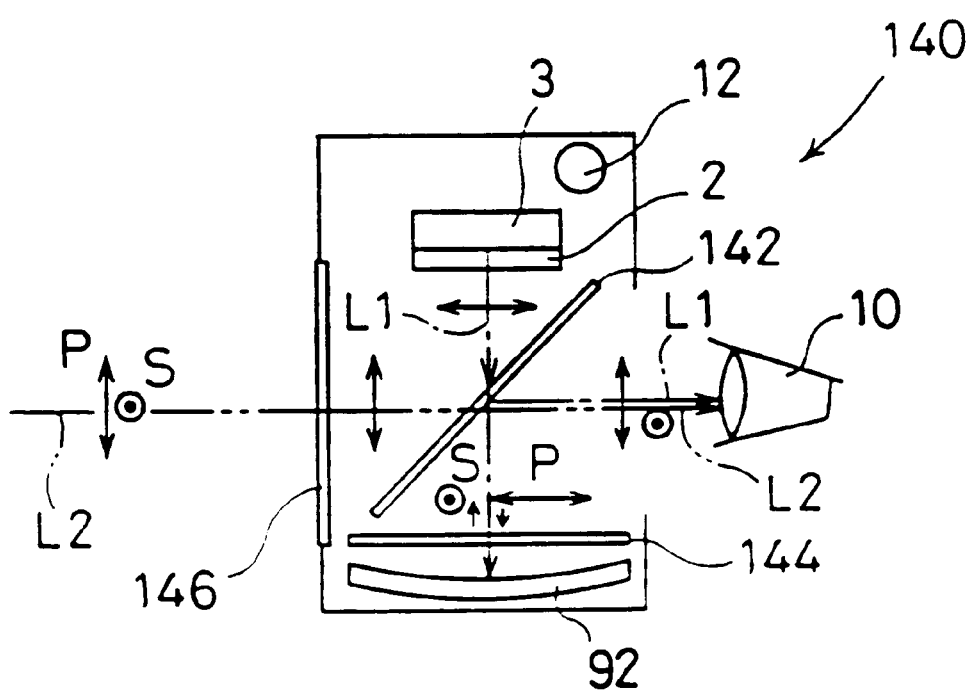
FIG. 19 illustrates the structure of an optical system in a thirteenth embodiment according to the present invention.

FIG. 19 illustrates the structure of a thirteenth embodiment according to the present invention. An optical unit 140 has a similar structure to that of the optical unit 95 of the ninth embodiment shown in FIG. 15, except that the half mirror 18 is replaced by a polarizing beam splitter 142, that the partially transparent screen plate 96 is replaced by a polarizing plate 146, and that a λ/4 wave plate 144 is disposed above the concave half mirror 92. The concave half mirror 92 may be replaced by a concave mirror.

The image beam L1 emitted from the liquid crystal panel 2 passes through the polarizing beam splitter 142 and enters the λ/4 wave plate 144. The image beam L1 emitted from the liquid crystal panel 2 is p-polarized light, and the polarizing beam splitter 142 has the characteristics of transmitting p-polarized light almost 100% and reflecting s-polarized light almost 100%. The image beam L1 passing through the polarizing beam splitter 142 is converted to circular polarized light by the λ/4 wave plate 144 and is then reflected from the inner surface of the concave half mirror 92. Reflection from the concave half mirror 92 reverses the direction of rotation of the vibration vector of circular polarized light. The image beam L1 of circular polarized light again enters the λ/4 wave plate 144 and is converted to s-polarized light. The image beam L1 of s-polarized light is reflected by the polarizing beam splitter 142 and enters the eye 10 of the user.

The background beam L2, on the other hand, includes random polarized light components, and only the p-polarized light component passes through the polarizing plate 146. Almost 100% of the part of the background beam L2 which has passed through the polarizing plate 146 also passes through the polarizing beam splitter 142 and enters the eye 10 of the user.

As discussed above, since the image combining device used in the thirteenth embodiment is the polarizing beam splitter 142, the image beam L1 from the liquid crystal panel 2 is reflected or transmitted here without any significant loss. This improves the brightness of the display image observed by the user. Replacement of the concave half mirror 92 with a concave mirror further improves the brightness of the observed display image. One possible modification is to use a partially transparent screen plate for a single eye or both eyes, in order to adjust the relationship of brightness between the background image and the display image.

Figure 20:
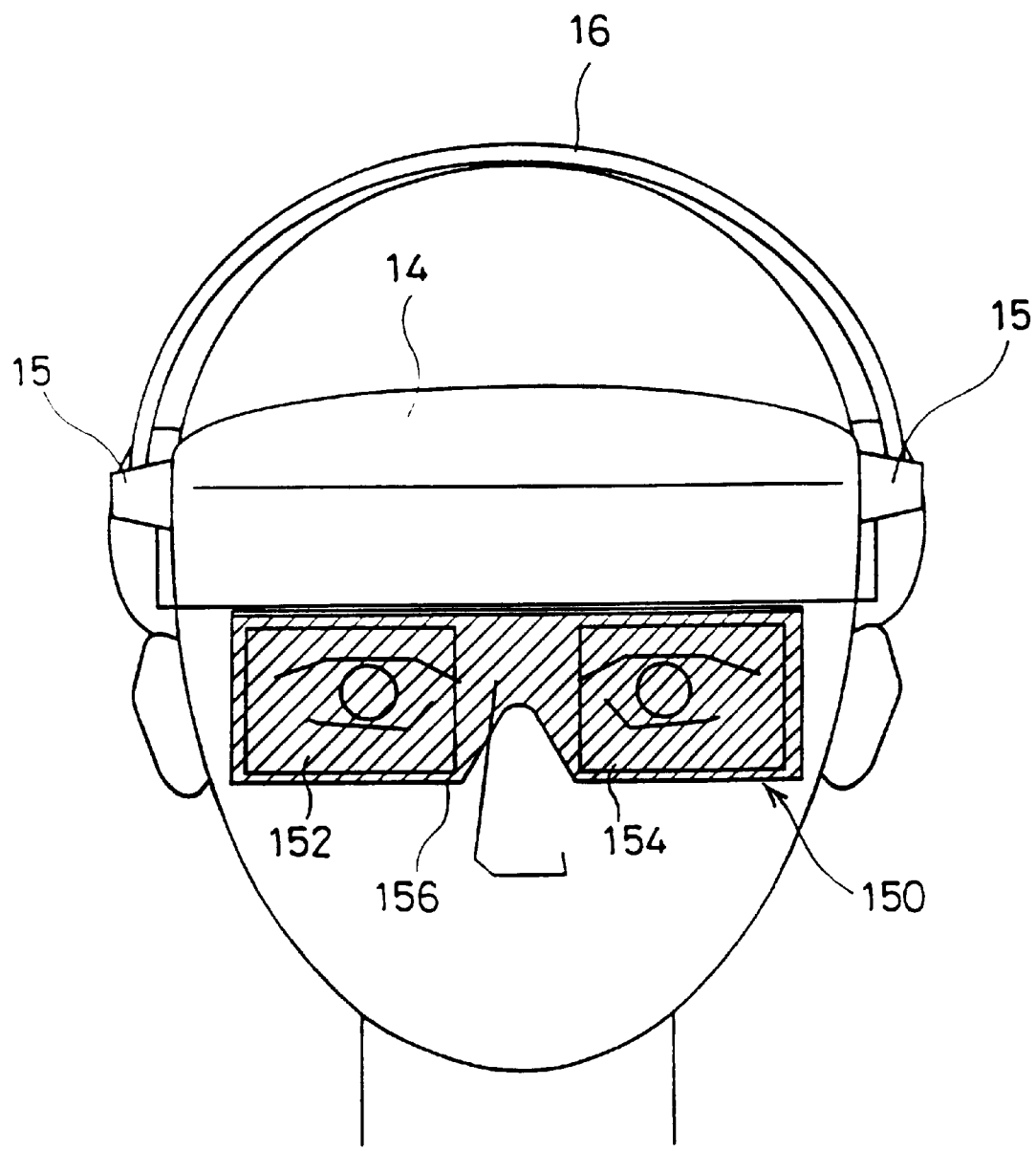
FIG. 20 shows the appearance of a fourteenth embodiment according to the present invention.

FIG. 20 shows the appearance of a fourteenth embodiment according to the present invention. This HMD includes a variable transmittance plate 150 for two eyes. Any one of the optical units discussed in the above embodiments may be used here as the optical unit for making the image beam L1 enter the eye of the user.

Figure 21:
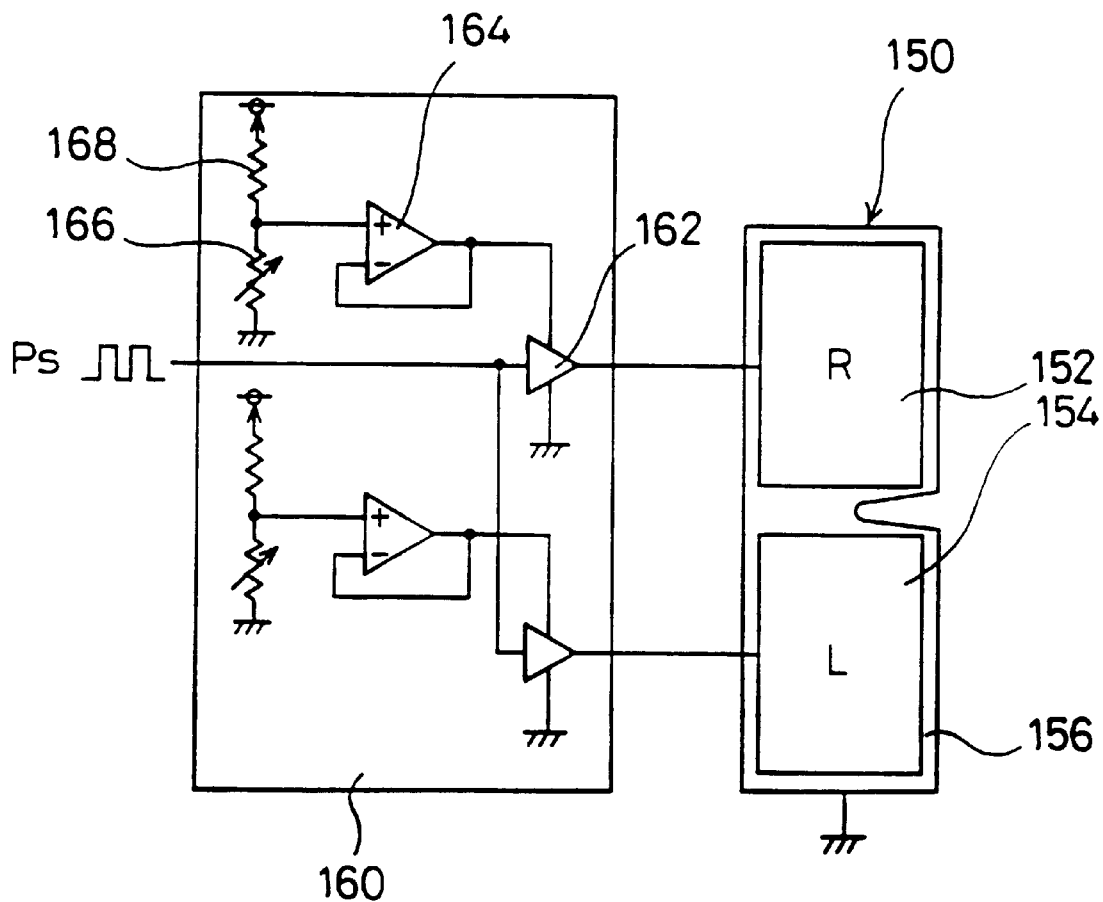
FIG. 21 shows a variable transmittance semi-transparent plate and a circuit diagram of its control circuit used in the fourteenth embodiment of the present invention.

FIG. 21 is a block diagram illustrating electrical structure of the variable transmittance plate 150 and a control circuit 160 thereof. The variable transmittance plate 150 has a liquid crystal panel structure including two transparent electrodes 152 and 154, which respectively include at least the visual fields of the virtual images for the left eye and the right eye, and a transparent counter electrode 156 of a wide area including the transparent electrodes 152 and 154. The transparent counter electrode 156 is grounded, and the left and right transparent electrodes 152 and 154 are connected to the control circuit 160.

The control circuit 160 includes two driving circuits for the transparent electrodes 152 and 154. Each driving circuit includes a buffer amplifier 162, an operational amplifier 164, a variable resistance 166, and a resistance 168. The operational amplifier 164 receives a partial source voltage via the variable resistance 166 and the resistance 168. An output terminal of the operational amplifier 164 is connected to a source terminal of the buffer amplifier 162. The source voltage whose level is determined by the variable resistance 166 and the operational amplifier 164 is accordingly supplied to the buffer amplifier 162. The user can arbitrarily set the value of the variable resistance 166 by operating a non-illustrated dial.

An input terminal of the buffer amplifier 162 receives a pulse signal Ps for driving the variable transmittance plate 150 which is liquid crystal panel. The buffer amplifier 162 the amplitude of the pulse signal Ps in response to the source voltage supplied from the operational amplifier 164 and supplies the modulated pulse signal to the transparent electrode 152 (or 154).

The left and the right transmittances of the variable transmittance plate 150 are varied in accordance with a variation in amplitude of the driving signal given to the transparent electrodes 152 and 154. The value of the variable resistance 166 can be adjusted independently for the left and the right transparent electrodes 152 and 154, so that the left and the right transmittances of the variable transmittance plate 150 can be controlled independently of each other. This structure enables the brightness of the visual field to be controlled, respectively, for the eye that sees the display image and for the eye that does not see the display image, thereby readily setting the environment that facilitates observation of images by the user.

In the above embodiments, the planar half mirror or the concave half mirror may be replaced by a semi-transmission mirror having polarization selectivity (for example, a polarizing beam splitter), if possible. The half mirror may thus be implemented by a semi-transmission mirror without polarization selectivity or a semi-transmission mirror with polarization selectivity.

The partially transparent screen plate in the respective embodiments may be implemented by a semi-transparent member without polarization selectivity or a semi-transparent member with polarization selectivity. These semi-transparent members are preferably thin plates, although blocks are allowable. The term "plates" here has a wide meaning including both non-curved plate members and curved plate members.

The reflecting mirror in the respective embodiments may be replaced by another optical element having a reflecting surface (for example, a prism). Furthermore, an optical element having a polarizing separation surface can generally be used as the polarizing beam splitter.

A variety of devices other than the liquid crystal panel 2 may be applied for the image display means. By way of example, another flat panel display, such as a plasma display, may be used instead.

Obviously, numerous modifications and variations of the present invention are possible in light of the above teachings. It is therefore to be understood that within the scope of the appended claims, the invention may be practiced otherwise than as specifically described herein.

What is claimed is:

1. A head mount display, comprising:

an image display device;

a magnifying optical device configured to refract a first light beam representing an image formed on the image display device and thereby magnifying the image to create a magnified virtual image which is to be observed with one of the eyes of a user;

an image combining device for making the first light beam representing the virtual image enter the eye of the user simultaneously with a second light beam from a background view, thereby combining the virtual image with the background view to form a composite image; and a switching device configured to shift at least two among the image display device, the magnifying optical device, and the image combining device, in order to make a switch between a first state in which the composite image of the virtual image and the background view is observed with one eye of the user and a second state in which the composite image is observed with the other eye of the user.

* * * * *